(12) United States Patent
Pijl et al.

(10) Patent No.: US 12,119,533 B2
(45) Date of Patent: Oct. 15, 2024

(54) BEAMFORMER INTEGRATED CIRCUITS WITH MULTIPLE-STAGE HYBRID SPLITTER/COMBINER CIRCUITS

(71) Applicant: NXP B.V., Eindhoven (NL)

(72) Inventors: Jasper Pijl, Eindhoven (NL); Mark Pieter van der Heijden, Eindhoven (NL)

(73) Assignee: NPX B.V., Eindhoven (NL)

( * ) Notice: Subject to any disclaimer, the term of this patent is extended or adjusted under 35 U.S.C. 154(b) by 362 days.

(21) Appl. No.: 17/457,472

(22) Filed: Dec. 15, 2021

(65) Prior Publication Data
US 2023/0187805 A1 Jun. 15, 2023

(51) Int. Cl.
*H01P 5/16* (2006.01)
*H01Q 3/38* (2006.01)
*H04B 1/40* (2015.01)

(52) U.S. Cl.
CPC ............... *H01P 5/16* (2013.01); *H01Q 3/38* (2013.01); *H04B 1/40* (2013.01)

(58) Field of Classification Search
CPC ...... H01P 5/12; H01P 5/16; H01P 5/10; H01P 5/18; H01P 5/187; H01P 5/185; H01P 5/182; H01P 1/213; H01Q 3/40; H01Q 3/26; H01Q 21/0006; H01Q 3/36; H01Q 3/28; H03H 7/48
See application file for complete search history.

(56) References Cited

U.S. PATENT DOCUMENTS

| | | | |
|---|---|---|---|
| 8,482,364 B2 | 7/2013 | Floyd et al. | |
| 9,680,196 B2* | 6/2017 | Yoon | H01P 5/16 |
| 2003/0090337 A1* | 5/2003 | Culliton | H01P 5/12 |
| | | | 333/101 |
| 2005/0052259 A1* | 3/2005 | Okazaki | H01P 5/04 |
| | | | 333/118 |

(Continued)

FOREIGN PATENT DOCUMENTS

| | | |
|---|---|---|
| CN | 202721250 U | 2/2013 |
| CN | 205882142 U | 1/2017 |

OTHER PUBLICATIONS

Arun Natarajan et al "A Fully-Integrated 16-Element Phased-Array Receiver in SiGe BiCMOS for 60-GHz Communications" IEEE Journal of Solid-State Circuits, vol. 46, No. 5, May 2011, 17 pages.

(Continued)

*Primary Examiner* — John W Poos
(74) *Attorney, Agent, or Firm* — Sherry W Gourlay

(57) ABSTRACT

A multiple-stage splitter/combiner circuit includes first and second splitter/combiner circuits coupled together. The first splitter/combiner circuit has first, second, and third input/output (I/O) ports, a first quarter wave line with a first end coupled to the first I/O port and a second end coupled to the second I/O port, a second quarter wave line with a first end coupled to the first I/O port and a second end coupled to the third I/O port, and a first resistor with first and second terminals coupled to the second and third I/O ports, respectively. The second splitter/combiner circuit has fourth, fifth, and sixth I/O ports, and a ring of multiple quarter wave lines, which includes third and fourth quarter wave lines. The third and fourth quarter wave lines each extend from the fourth I/O port in different directions from each other to the fifth and sixth I/O ports, respectively.

20 Claims, 10 Drawing Sheets

(56) References Cited

U.S. PATENT DOCUMENTS

2011/0063048 A1* 3/2011 Floyd .................. H03F 3/602
333/136
2018/0053984 A1* 2/2018 Goto .................. H01P 5/10

OTHER PUBLICATIONS

Jin Guan "Designing power divider by combining Wilkinson and Gysel structure" Electronics Letters Jun. 21, 2012 vol. 48 No. 13, 2 pages.

Mohammad A. Maktoomi et al. "A Novel Power Divider Structure using the Gysel and Wilkinson Power Dividers with only one Grounded Resistor" 2015 IEEE International Microwave and RF Conference (IMaRC), 3 pages.

Wonseok Choe et al; "N-Way Unequal Wilkinson Power Divider With Physical Output Port Separation"; IEEE Microwave and Wireless Components Letters, vol. 26, No. 4; 3 pages, Apr. 2016.

Wonseok Choe et al; "Compact Modified Wilkinson Power Divider With Physical Output Port Isolation"; IEEE Microwave and Wireless Components Letters, vol. 24, No. 12; 3 pages, Dec. 2014.

Ernest J. Wilkinson; "An N-Way Hybrid Power Divider"; IRE Transactions on Microwave Theory and Techniques; 3 pages (Jan. 1960).

Gysel, Ulrich H., "A New N-Way Power Divider/Combiner Suitable for High-Power Applications", Microwave Symposium, May 12, 1975, pp. 116-118, IEEE, Piscataway, NJ, USA.

Jaworski, Grzegorz et al., "A Design of Feeding Network for Dual-Linear Polarization, Stacked, Probe-Fed Microstrip Patch Antenna Array", 15th International Conference on Microwaves, Radar and Wireless Communications, May 17, 2004, pp. 473-476, vol. 2, IEEE, Piscataway, NJ, USA.

* cited by examiner

BEAMFORMER INTEGRATED CIRCUITS
WITH MULTIPLE-STAGE HYBRID
SPLITTER/COMBINER CIRCUITS

TECHNICAL FIELD OF THE INVENTION

The present invention relates generally to beamformer integrated circuits (ICs). More specifically, the present invention relates to signal splitter/combiner circuits implemented in multi-channel phased-array beamformer ICs.

BACKGROUND OF THE INVENTION

In a phased-array antenna system, a beamformer is used to provide directional signal transmission or reception. For directional signal transmission, the beamformer includes a signal splitter/combiner circuit with a plurality, N, of input/output (I/O) ports. The signal splitter/combiner circuit splits an input radio frequency (RF) signal into N RF signals, and provides the N RF signals to input ports of N transmitter or transceiver channels. The N transmitter or transceiver channels amplify and adjust the phases of the N RF signals so that the relative phasing causes the signals to constructively interfere with each other in a particular direction when the signals are radiated over the air interface by a plurality of antenna elements of the antenna array. For directional signal reception, the beamformer receives a plurality, N, of RF signals from the antenna array, and each of N receiver or transceiver channels amplifies one of the received RF signals, while adjusting the relative phases of the received signals to align the signals before providing the signals at N output ports of the receiver or transceiver channels. The signal splitter/combiner circuit is then utilized to combine the N signals together into a single output RF signal.

A multi-channel phased-array beamformer integrated circuit (IC) is used to support the circuit components of the beamformer, including the antenna array, the amplifiers, the phase shifters, the splitter/combiner circuit, and the routing that electrically connects these various components. A challenge faced by beamformer IC developers is to optimize routing between components in order to reduce losses associated with such routing. In addition, beamformer IC developers strive to reduce chip area while achieving good performance.

SUMMARY

Aspects of the disclosure are defined in the accompanying claims.

In a first aspect, there is provided a multiple-stage splitter/combiner circuit that includes first and second splitter/combiner circuits. The first splitter/combiner circuit includes a first input/output (I/O) port, a second I/O port, a third I/O port, a first quarter wave line with a first end coupled to the first I/O port and a second end coupled to the second I/O port, a second quarter wave line with a first end coupled to the first I/O port and a second end coupled to the third I/O port, and a first resistor with a first terminal coupled to the second I/O port and a second terminal coupled to the third I/O port. The second splitter/combiner circuit is coupled to the first splitter/combiner circuit, and the second splitter/combiner circuit includes a fourth I/O port, a fifth I/O port, a sixth I/O port, and a ring of multiple quarter wave lines that includes a third quarter wave line with a first end coupled to the fourth I/O port and a second end coupled to the fifth I/O port, a fourth quarter wave line with a first end coupled to the fourth I/O port and a second end coupled to the sixth I/O port, a fifth quarter wave line with a first end coupled to the fifth I/O port, and a sixth quarter wave line with a first end coupled to the sixth I/O port and a second end coupled to a second end of the fifth quarter wave line. The third quarter wave line and the fourth quarter wave line extend from the fourth I/O port in different directions from each other.

In another aspect, there is provided a beamformer integrated circuit that includes a system-side radio frequency (RF) input/output (I/O) terminal, N antenna-side RF I/O terminals, N transceiver channels electrically coupled to the N antenna-side RF I/O terminals, and a multiple-stage splitter/combiner circuit electrically coupled between the system-side RF I/O terminal and the N transceiver channels. The multiple-stage splitter/combiner circuit includes first and second splitter/combiner circuits. The first splitter/combiner circuit includes a first input/output (I/O) port, a second I/O port, a third I/O port, a first quarter wave line with a first end coupled to the first I/O port and a second end coupled to the second I/O port, a second quarter wave line with a first end coupled to the first I/O port and a second end coupled to the third I/O port, and a first resistor with a first terminal coupled to the second I/O port and a second terminal coupled to the third I/O port. The second splitter/combiner circuit is coupled to the first splitter/combiner circuit, and the second splitter/combiner circuit includes a fourth I/O port, a fifth I/O port, a sixth I/O port, and a ring of multiple quarter wave lines that includes a third quarter wave line with a first end coupled to the fourth I/O port and a second end coupled to the fifth I/O port, a fourth quarter wave line with a first end coupled to the fourth I/O port and a second end coupled to the sixth I/O port, a fifth quarter wave line with a first end coupled to the fifth I/O port, and a sixth quarter wave line with a first end coupled to the sixth I/O port and a second end coupled to a second end of the fifth quarter wave line. The third quarter wave line and the fourth quarter wave line extend from the fourth I/O port in different directions from each other.

In yet another aspect, there is provided a communication system that includes a beamformer and N antenna elements. The beamformer includes a system-side radio frequency (RF) input/output (I/O) terminal, N antenna-side RF I/O terminals, N transceiver channels electrically coupled to the N antenna-side RF I/O terminals, and a multiple-stage splitter/combiner circuit electrically coupled between the system-side RF I/O terminal and the N transceiver channels. The multiple-stage splitter/combiner circuit includes first and second splitter/combiner circuits. The first splitter/combiner circuit includes a first input/output (I/O) port, a second I/O port, a third I/O port, a first quarter wave line with a first end coupled to the first I/O port and a second end coupled to the second I/O port, a second quarter wave line with a first end coupled to the first I/O port and a second end coupled to the third I/O port, and a first resistor with a first terminal coupled to the second I/O port and a second terminal coupled to the third I/O port. The second splitter/combiner circuit is coupled to the first splitter/combiner circuit, and the second splitter/combiner circuit includes a fourth I/O port, a fifth I/O port, a sixth I/O port, and a ring of multiple quarter wave lines that includes a third quarter wave line with a first end coupled to the fourth I/O port and a second end coupled to the fifth I/O port, a fourth quarter wave line with a first end coupled to the fourth I/O port and a second end coupled to the sixth I/O port, a fifth quarter wave line with a first end coupled to the fifth I/O port, and a sixth quarter wave line with a first end coupled to the sixth I/O port and a second end coupled to a second end of the fifth quarter wave line. The third quarter wave line and the fourth quarter wave line extend from the fourth I/O port in different directions from each other. Each of the N antenna elements includes a connection point associated with a first polarization, and the N antenna-side RF I/O terminals each are coupled to the connection point of a different one of the N antenna elements.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

Figure 1:
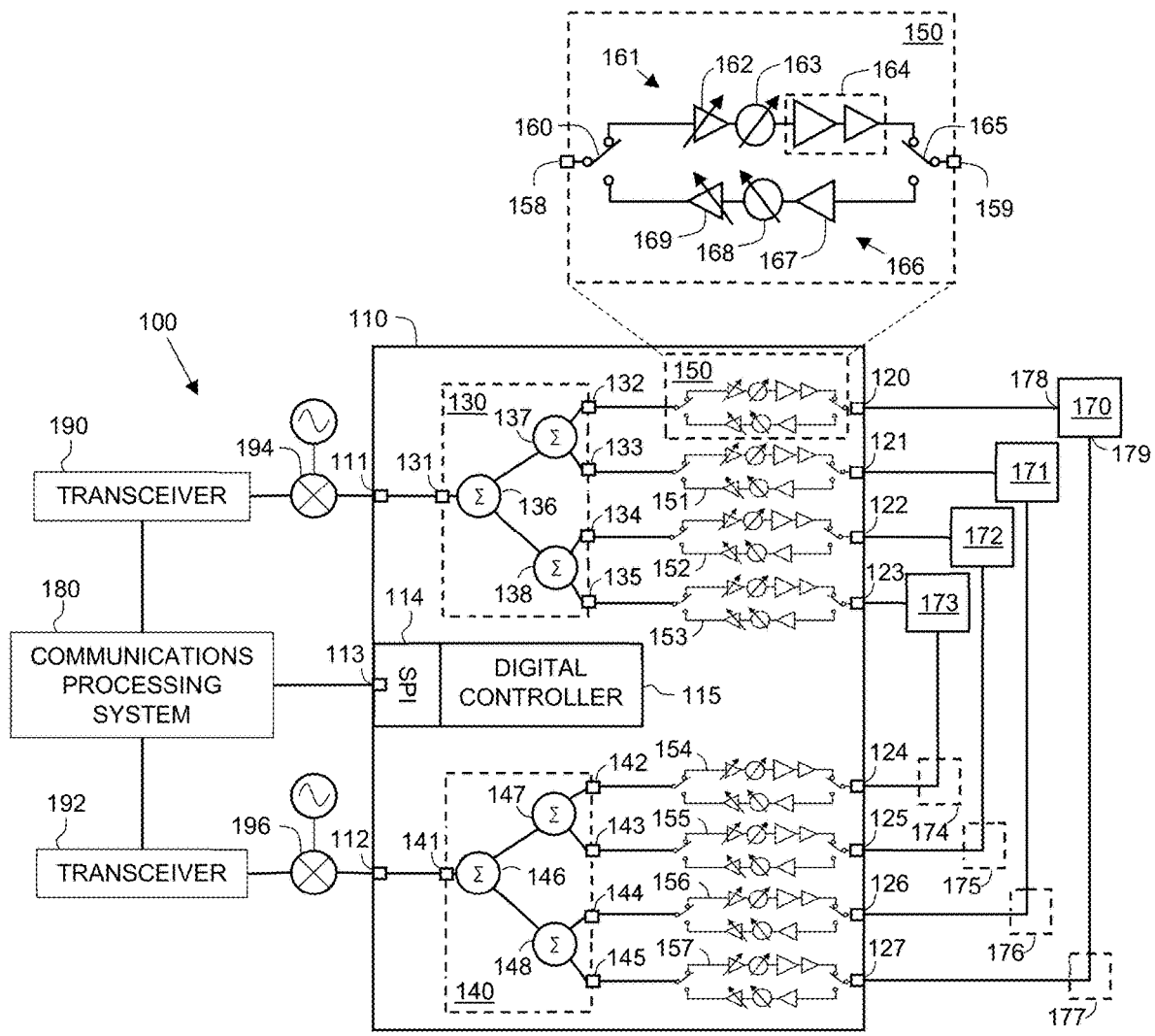
FIG. 1 illustrates a functional block diagram of communication system that includes a dual-polarization, 8-channel, phased-array beamformer, in accordance with an embodiment.

According to various embodiments discussed herein, an N-channel phased-array beamformer integrated circuit (IC) includes an RF signal splitter/combiner circuit and N transceiver channels. The signal splitter/combiner circuit includes N "antenna-side" input/output (I/O) ports, which are electrically connected to N I/O ports of the N transceiver channels through conductive routing lines of the beamformer IC. Due to the specific floorplan of an N-channel phased-array beamformer IC, the N I/O ports of the splitter/combiner circuit may be in sub-optimal locations that necessitate relatively long routing lines between the N antenna-side I/O ports of the splitter/combiner circuit and the N I/O ports of the transceiver channels. Such relatively long routing lines may be characterized by signal losses, which may decrease the overall performance of the system. This performance issue arises because some conventional splitting/combining topologies have their I/O ports close together, while the I/O ports of the transceiver channels might be far apart, thus necessitating relatively long and lossy routing lines between the splitter/combiner circuit and the transceiver channels. Other conventional combining/splitting topologies may include I/O ports that are spaced farther apart, but such topologies generally are characterized by relatively large chip area consumption.

Embodiments of the inventive subject matter described herein include N-way (where N is greater than or equal to 4), "hybrid" splitter/combiner circuits, each of which includes multiple, differently-configured types of splitter/combiner stages. These embodiments are in contrast to conventional splitter/combiner circuits, which utilize multiple splitter/combiner stages of the same type to achieve an N-way splitter/combiner circuit. Utilization of differently-configured splitter/combiner stages, in accordance with the various embodiments, enables a beamformer IC developer to position the N antenna-side I/O ports of a hybrid splitter/combiner circuit relatively close to the I/O ports of the N transceiver channels, thus enabling a minimization of the length of conductive routing lines between the I/O ports of the hybrid splitter/combiner circuit and the I/O ports of the N transceiver channels. In addition, the hybrid splitter/combiner circuits of the various embodiments may be configured to consume a relatively small chip area, when compared with conventional splitter/combiner circuits that utilize the same types of splitter/combiner stages.

As described below, some communication systems into which embodiments of "hybrid" splitter/combiner circuits are incorporated include two-way communication systems, in that the communication systems are configured both to produce and transmit RF signals over an air interface in a transmit mode of operation, and also are configured to receive RF signals from the air interface and process those received signals in a receive mode of operation. Accordingly, as will be described in more detail below, certain communication systems include various transceivers and channels (e.g., transceivers 190, 192, and transceiver channels 150-157, 250-257, 1080-1083, 1180-1183, FIGS. 1, 2, 10), each of which has a transmit path to amplify and process RF signals for transmission over the air interface, and a receive path to amplify and process RF signals received over the air interface. In other embodiments, the hybrid splitter/combiner circuit embodiments may be incorporated into communication systems that are configured only to transmit RF signals or to receive RF signals, but not both. Accordingly, although the below description discusses transceivers (or channels) that are configured for two-way communication, those of skill in the art would understand, based on the description herein, that the various embodiments discussed in conjunction with FIGS. 1-10 could be modified to provide for one-way communication (transmit or receive, but not both). Such embodiments are intended to be included in the scope of the inventive subject matter.

Along those lines, references are made throughout this specification to embodiments of multiple-stage "splitter/combiner circuits" (e.g., circuits 130, 140, 230, 240, 260, 264, 400, 500, 600, 700, 800, 900, 1002, 1102, FIGS. 1, 2, 4-10). The "splitter" functionality is associated with the circuit performing a transmit-related function during a transmit mode of operation, and the "combiner" functionality is associated with the circuit performing a receive-related function during a receive mode of operation. In the various embodiments described herein, such splitter/combiner circuits are configured to perform both splitting and combining of RF signals. Those of skill in the art would understand, based on the description herein, that when the splitter/combiner circuits of the various embodiments are incorporated into transmit-only systems, the "splitter/combiner circuit" would function only as a "splitter circuit." Conversely, when the splitter/combiner circuits of the various embodiments are incorporated into receive-only systems, the "splitter/combiner circuit" would function only as a "combiner circuit." Accordingly, the term "splitter/combiner circuit" should be interpreted to mean "a splitter circuit", "a combiner circuit," or a "combined splitter and combiner circuit," depending on the type of system into which the "splitter/combiner circuit" is incorporated (i.e., an RF transmitter system, an RF receiver system, or a combined RF transmitter/receiver (transceiver) system, respectively). Such embodiments are intended to be included in the scope of the inventive subject matter.

FIG. 1 illustrates a functional block diagram of a communication system 100 that includes a dual-polarization, N-channel, phased-array beamformer 110, in accordance with an embodiment. Communication system 100 is a two-way communication system (i.e., including both transmit and receive functionality), which includes a communication processing system 180, first and second transceivers 190, 192, first and second up/down converters 194, 196, an embodiment of a dual-polarization, N-channel beamformer 110, and a plurality of antenna elements 170, 171, 172, 173. In the illustrated embodiment, N=8, meaning that the communication system 100 is an 8-channel system that is configured to provide 8 transmit RF signals to antenna elements 170-173 and/or to receive 8 receive RF signals from the antenna elements 170-173. Those of skill in the art would understand, based on the description herein, that system 100 could be modified to have a different number, N, of channels (e.g., as few as 4 channels or more than 8 channels).

The communications processing system 180 is configured to produce RF signals for transmission in a transmit mode of operation, and to receive and process RF signals in a receive mode of operation. In the illustrated embodiment, the communications processing system 180 is more specifically configured to operate in a dual-polarized manner. This means that, during the transmit mode of operation, the communications processing system 180 produces two distinct transmit RF signals ("first and second" transmit RF signals), where each of these signals is provided to a different one of the transceivers 190, 192. During the receive mode of operation, the communications processing system 180 receives two distinct receive RF signals ("first and second" receive RF signals) from the transceivers 190, 192.

The first and second RF signals (whether transmit or receive signals) generally may be independent of each other, and thus may include different encoded data streams. As will be described in detail later, in the transmit mode of operation, a first transmit RF signal provided to the first transceiver 190 will be split into N/2 first transmit RF signals that are processed through the beamformer 110 and applied to first connection points (sides) (e.g., connection point 178) on the antenna elements 170-173 that are associated with a first polarization (e.g., an H polarization), and a second transmit RF signal provided to the second transceiver 192 will be split into N/2 second transmit RF signals that are processed through the beamformer 110 and applied to second connection points (sides) (e.g., connection point 179) on the antenna elements 170-173 that are associated with an orthogonal, second polarization (e.g., a V polarization). In the receive mode of operation, N/2 first receive RF signals are conveyed from the first connection points (e.g., connection point 178) on the antenna elements 170-173 through the beamformer 110, which combines the signals and provides a first resultant receive RF signal through the first transceiver 190 to the communications processing system 180, and N/2 second receive RF signals are conveyed from the second connection points (e.g., connection point 179) on the antenna elements 170-173 through the beamformer 110, which combines the signals and provides a second resultant receive RF signal through the second transceiver 192 to the communications processing system 180.

In an alternate embodiment, the system 100 may be configured as a single-polarization system. Such a system may include additional antenna elements 174-177, which are depicted using dashed boxes to indicate their alternate or optional inclusion. More specifically, in a single-polarization system, each of the N transmit or receive RF signals is conveyed to or by a single dedicated antenna element 170-177.

Each of the transceivers 190, 192 may include a transmit path and a receive path. The transmit path may include, for example, a power amplifier (e.g., a Doherty power amplifier or other type of power amplifier) configured to amplify a transmit RF signal received from the communications processing system 180 prior to providing the transmit RF signal to an up/down converter 194, 196 for up-conversion. The receive path may include, for example, a low noise amplifier (LNA) configured to receive a receive RF signal that has been down-converted by the up/down converter 194, 196, and to amplify the receive RF signal prior to providing the receive RF signal to the communications processing system 180.

As mentioned previously, beamformer 110 is an 8-channel beamformer (i.e., N=8, although N may be a different number). According to an embodiment, beamformer 110 includes first and second, "system-side" RF I/O terminals 111, 112, a data/control terminal 113, 8 "antenna-side" RF I/O terminals 120, 121, 122, 123, 124, 125, 126, 127, first and second, multiple-stage, hybrid splitter/combiner circuits 130, 140, 8 transceiver channels 150, 151, 152, 153, 154, 155, 156, 157, a digital data interface 114 (e.g., a serial-peripheral interface or "SPI"), and a digital controller 115. As used herein, the term "system-side I/O terminal" means an I/O terminal that is connected to the processing components of an RF system (e.g., to communications processing system 180 and transceivers 190, 192), and the term "antenna-side I/O terminal" means an I/O terminal that is connected to the system antennas (e.g., to antenna elements 170-177). As used herein, a "terminal" generally may correspond to an I/O point for a circuit, and more specifically may correspond to a package lead or other I/O structure for a packaged semiconductor device. Conversely, the term "port," as used herein, generally may correspond to an I/O point for a circuit that is located within a packaged semiconductor device, rather than corresponding to a package lead or terminal. These terms are used for convenience only, and those of skill in the art would understand that the terms "terminal" and "port" may be used interchangeably, and should not be construed to limit the scope of the inventive subject matter.

The transceivers 190, 192 and up/down converters 194, 196 are coupled to the first and second, system-side I/O terminals 111, 112, and the communications processing system 180 is coupled to the data/control terminal 113. Through the data/control terminal 113, the digital data interface 114 is configured to receive control information and data from the communications processing system 180. For example, the received control information may include control data indicating whether the beamformer 110 is to operate in a transmit mode or a receive mode, along with control data indicating various phase shifts and/or attenuation levels that the transceiver channels 150-157 should apply to the transmit and receive RF signals.

The digital data interface 114 is configured to provide the control data to the digital controller 115. Based on control data indicating whether the beamformer 110 should be in a transmit mode of operation or a receive mode of operation, the digital controller 115 may produce switch control signals that control the states of switches (e.g., switches 160, 165) in the transceiver channels 150-157. The switch control signals may cause the switches either to complete transmit paths between I/O ports (e.g., ports 158, 159) of the transceivers 150-157, or to complete receive paths between the I/O ports of the transceivers 150-157.

Although not illustrated in FIG. 1, multiple control traces extend between the digital controller 115 and various components of the beamformer 110 (e.g., switches 160, 165, attenuators 162, 169, and phase shifters 163, 168). Based on control data from the digital interface 114 indicating various phase shifts and/or attenuation levels that the transceiver channels 150-157 should apply, the digital controller 115 may convey phase shift control signals and attenuation control signals over the control traces. The phase shift control signals control the magnitudes of phase shifts applied to the RF signals by phase shifters (e.g., phase shifters 163, 168) of the transceiver channels 150-157, and the attenuation control signals control the magnitudes of attenuation applied to the RF signals by attenuators (e.g., attenuators 162, 169) of the transceiver channels 150-157. This enables the beamformer 110 to "steer" the communication beams produced by the antenna elements 170-173 into desired directions (i.e., to provide a beamforming function).

Each of the first and second hybrid splitter/combiner circuits 130, 140 includes a system-side I/O port 131, 141, N/2 channel-side I/O ports 132-135, 142-145, and first and second splitter/combiner stages. Each system-side I/O port 131, 141 of the hybrid splitter/combiner circuits 130, 140 is connected to a system-side RF I/O terminal 111, 112 of the beamformer 110 (and thus to transceivers 190, 192 and communications processing system 180). Conversely, each channel-side I/O port 132-135, 142-145 of the hybrid splitter/combiner circuits 130, 140 is connected to a different one of the transceiver channels 150-157. As used herein, the term "channel-side I/O port" means an I/O port of a splitter/combiner circuit (e.g., one of ports 132-135, 142-145) that is connected to a transceiver channel of a beamformer (e.g., to one of transceiver channels 150-157).

The first and second splitter/combiner stages are connected between the system-side I/O ports 131, 141 and the channel-side I/O ports 132-135, 142-145. More specifically, for hybrid splitter/combiner circuit 130, the first splitter/combiner stage consists of a single "first-stage" splitter/combiner circuit 136, which includes a first I/O port connected to system-side I/O port 131, and two additional "interior" I/O ports, each connected to a different splitter/combiner circuit 137, 138 of the second splitter/combiner stage. Accordingly, the first splitter/combiner stage (and the first-stage splitter/combiner circuit 136) is configured in the transmit mode of operation to split an RF signal received at I/O port 131 into two RF signals that are produced at the two interior I/O ports referred to above, and is configured in the receive mode of operation to combine two RF signals received at the two interior I/O ports into a single RF signal that is produced at I/O port 131 (i.e., splitter/combiner circuit 136 functions as a 1:2 splitter or a 2:1 combiner).

The second splitter/combiner stage includes the two aforementioned "second-stage" splitter/combiner circuits 137, 138, which are connected in parallel between the first splitter/combiner stage and the channel-side I/O ports 132-135. More specifically, each second-stage splitter/combiner circuit 137, 138 includes a first I/O port corresponding to one of the two interior I/O ports referred to above, and two additional channel-side ports 132/133, 134/135.

Accordingly, in the second splitter/combiner stage, one of the second-stage splitter/combiner circuits 137 is configured in the transmit mode of operation to split an RF signal received at one of the interior I/O ports into two RF signals that are produced at channel-side I/O ports 132, 133, and is configured in the receive mode of operation to combine two RF signals at the two channel-side I/O ports 132, 133 into a single RF signal that is produced at the interior I/O port to which the splitter/combiner circuit 137 is connected. Similarly, the other one of the two second-stage splitter/combiner circuits 138 is configured in the transmit mode of operation to split an RF signal received at the other one of the interior I/O ports into two RF signals that are produced at channel-side I/O ports 134, 135, and is configured in the receive mode of operation to combine two RF signals at the two channel-side I/O ports 134, 135 into a single RF signal that is produced at the interior I/O port to which the splitter/combiner circuit 138 is connected. Accordingly, each of the second-stage splitter/combiner circuits 137, 138 functions as a 1:2 splitter or a 2:1 combiner, and the entire second splitter/combiner stage (consisting of circuits 137, 138) functions as a 2:4 splitter or a 4:2 combiner. That said, the entire hybrid splitter/combiner circuit 130 functions as a 1:4 splitter or a 4:1 combiner.

Similarly, hybrid splitter/combiner circuit 140 includes first and second splitter/combiner stages, where the first splitter/combiner stage consists of a single first-stage splitter/combiner circuit 146 coupled to system-side I/O port 141, and a second splitter/combiner stage consisting of two additional splitter/combiner circuits 147, 148 coupled to channel-side I/O ports 142/143 and 144/145, respectively. Hybrid splitter/combiner circuit 140 is configured and functions essentially identically to hybrid splitter/combiner circuit 130, and for the purpose of brevity, the configuration and functionality of circuit 140 will not be repeated here. That said, it bears repeating that the entire hybrid splitter/combiner circuit 140 functions as a 1:4 splitter or a 4:1 combiner.

As mentioned above, each of the channel-side I/O ports 132-135, 142-145 of the hybrid splitter/combiner circuits 130, 140 is connected to a different one of the N transceiver channels 150-157. Referring to the enlarged version of transceiver channel 150 at the top of FIG. 1, each transceiver channel 150-157 includes first and second I/O ports 158, 159 (or system-side and antenna-side I/O ports, respectively), first and second transmit/receive (TX/RX) switches 160, 165, a transmit path 161, and a receive path 166. Each first I/O port 158 is coupled to a different one of the channel-side I/O ports 132-135, 142-145, and each second I/O port 159 is coupled to a different one of the antenna-side RF I/O terminals 120-127 of the beamformer 110.

Within each transceiver channel 150-157, the first TX/RX switch 160 is connected between the first I/O port 158 and the transmit and receive paths 161, 166. Similarly, the second TX/RX switch 165 is connected between the second I/O port 159 and the transmit and receive paths 161, 166.

TX/RX switches 160, 165 are synchronously controlled through switch control signals from the digital controller 115. The TX/RX switches 160, 165 each include a single-pole, double-throw switch, in an embodiment, which may be implemented using one or more transistors (e.g., field effect transistors), a mechanical switch, or using another suitable structure. When the system 100 is to be configured in the transmit mode of operation, the TX/RX switches 160, 165 are controlled to be in a transmit state (as shown in FIG. 1), in which the switches 160-165 are closed to complete a conductive path between the first and second I/O ports 158, 159 and the transmit path 161, and to disconnect the receive path 166 from the circuit. Conversely, when the system 100 is to be configured in the receive mode of operation, the TX/RX switches 160, 165 are controlled to be in a receive state, in which the switches 160-165 are closed to complete a conductive path between the first and second I/O ports 158, 159 and the receive path 166, and to disconnect the transmit path 161 from the circuit.

According to an embodiment, the transmit path 161 includes a variable attenuator 162, a variable phase shifter 163, and an amplifier 164 coupled in series between the TX/RX switches 160, 165. In some embodiments, amplifier 164 may be a multiple-stage amplifier (e.g., a two-stage amplifier, as shown). Further, the receive path 166 includes an LNA 167, a variable phase shifter 168, and a variable attenuator 169 coupled in series between the TX/RX switches 165, 160. The variable attenuators 162, 169 and the variable phase shifters 163, 168 each may be controlled through control signals from the digital controller 115 to provide desired levels of attenuation and phase shift, respectively, to RF signals conveyed through the transmit and receive paths 161, 166. Each of the antenna-side I/O ports 159 of the transceiver channels 150-157 is coupled to a different one of the antenna-side RF I/O terminals 120-127 of the beamformer 110.

The antenna-side RF I/O terminals 120-127 of the beamformer 110 are coupled to the antenna elements 170-173 through conductive connections. According to an embodiment, the antenna elements 170-173 (or elements 170-177) constitute an array of antenna elements. Although not depicted in FIG. 1, the array of antenna elements may include multiple rows and multiple columns of antenna elements (e.g., as shown in the bottom view 303 of the beamformer system 300 in FIG. 3). Further, each antenna element 170-173 (or 170-177) may be implemented in the form of a rectangular or square patch antenna, with one or more connection points (e.g., connection points 178, 179) proximate to one or more sides of each patch antenna.

According to an embodiment in which the communication system 100 supports dual-polarization of transmitted or received RF signals, a first set of the antenna-side RF I/O terminals 120-123 associated with a first RF signal are connected to connection points 178 proximate to a first side of each antenna element 170-173, and a second set of the antenna-side I/O terminals 124-127 associated with a second RF signal are connected to connection points 179 proximate to a second side of each antenna element 170-173. The first and second sides of each antenna element 170-173 are adjacent and orthogonal to each other, which facilitates transmission or reception of the first and second RF signals over the air interface in a dual-polarized (e.g., H and V) manner.

In various alternate embodiments, the communication system 100 may support single-polarization of two different transmitted or received RF signals, or may support dual-polarization of two different transmitted or received RF signals in a different way from that described above. In such embodiments, system 100 includes N antenna elements 170-177, and each of the antenna-side RF I/O terminals 120-127 of the beamformer 110 is coupled to a different one of the N antenna elements 170-177. More specifically, according to these alternate embodiments, the conductive connections between I/O terminals 124-127 and antenna elements 170-173 are replaced with conductive connections between I/O terminals 124-127 and antenna elements 174-177. To support single-polarization of two different transmitted or received RF signals, these conductive connections are connected to connection points on the same side (or a parallel side) as connection points 178. In this manner, all of the antenna elements 170-177 are configured to transmit or receive RF signals in a single polarization. To support dual-polarization of two different transmitted or received RF signals in a different way from that described above, these conductive connections are connected to connection points on the same side (or a parallel side) as connection points 179. In this manner, antenna elements 170-173 are configured to transmit or receive RF signals in one polarization (e.g., H or V polarization), while antenna elements 174-177 are configured to transmit or receive RF signals in a second, different polarization (e.g., V or H polarization).

Figure 2:
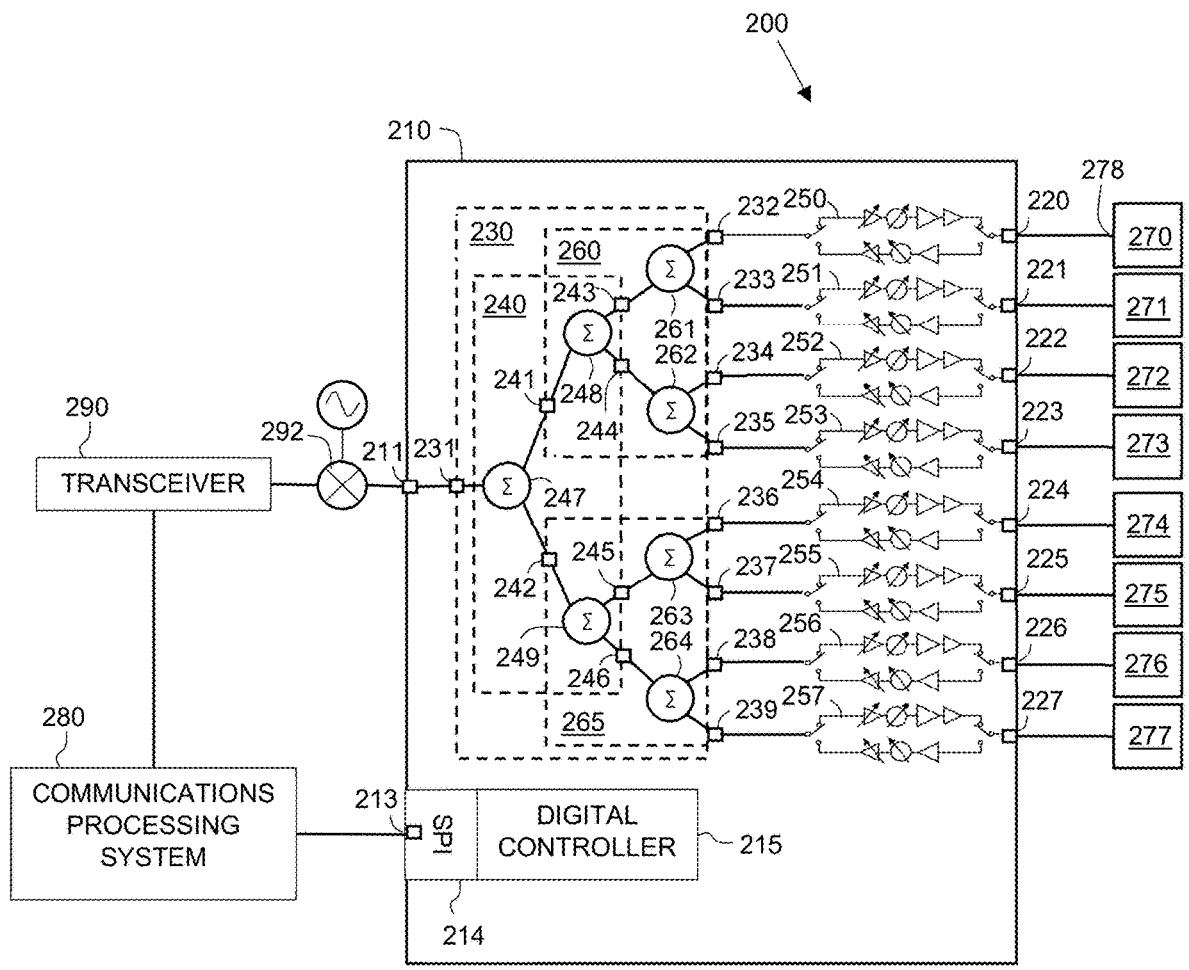
FIG. 2 illustrates a functional block diagram of communication system that includes a single-polarization, 8-channel phased-array beamformer, in accordance with another embodiment.

An alternate embodiment of a communication system 200 configured to support transmission and reception of single-polarized RF signals is depicted in FIG. 2. As with communication system 100, communication system 200 is a two-way communication system. System 200 includes a communication processing system 280, transceiver 290, up/down converter 292, an embodiment of a single-polarization, N-channel beamformer 210, and a plurality of antenna elements 270, 271, 272, 273, 274, 275, 276, 277. In the illustrated embodiment, N=8, meaning that the communication system 200 is an 8-channel system that is configured to provide 8 transmit RF signals to antenna elements 270-277 and/or to receive 8 receive RF signals from the antenna elements 270-277. Those of skill in the art would understand, based on the description herein, that system 200 could be modified to have a different number, N, of channels.

The communications processing system 280 is configured to produce transmit RF signals for transmission in a transmit mode of operation, and to receive and process receive RF signals in a receive mode of operation. In the transmit mode of operation, a transmit RF signal provided to transceiver 290 will be split into N transmit RF signals that are processed through the beamformer 210 and applied to connection points (sides) (e.g., connection point 278) on the antenna elements 270-277. Each of the connection points may be on a same side of antenna element or on a parallel, opposite side, which will result in single polarization of the transmit RF signals. In the receive mode of operation, N first receive RF signals are conveyed from the connection points (e.g., connection point 278) on the antenna elements 270-277 through the beamformer 210, which combines the signals and provides a first resultant receive RF signal through the first transceiver 290 to the communications processing system 280.

Transceiver 290 may include a transmit path and a receive path. The transmit path may include, for example, a power amplifier (e.g., a Doherty power amplifier or other type of power amplifier) configured to amplify a transmit RF signal received from the communications processing system 280 prior to providing the transmit RF signal to an up/down converter 292 for up-conversion. The receive path may include, for example, an LNA configured to receive a receive RF signal that has been down-converted by the up/down converter 292, and to amplify the receive RF signal prior to providing the receive RF signal to the communications processing system 280.

As mentioned previously, beamformer 210 is an 8-channel beamformer (i.e., N=8, although N may be a different number). According to an embodiment, beamformer 210 includes a "system-side" I/O terminal 211, a data/control terminal 213, 8 "antenna-side" I/O terminals 220, 221, 222, 223, 224, 225, 226, 227, a multiple-stage, hybrid splitter/combiner circuit 230, 8 transceiver channels 250, 251, 252, 253, 254, 255, 256, 257, a digital data interface 214 (e.g., a serial-peripheral interface or "SPI"), and a digital controller 215.

The transceiver 290 and up/down converter 292 are coupled to the system-side I/O terminal 211, and the communications processing system 280 is coupled to the data/control terminal 213. Through the data/control terminal 213, the digital data interface 214 is configured to receive control information and data from the communications processing system 280, as discussed above in conjunction with FIG. 1.

The digital data interface 214 is configured to provide the control data to the digital controller 215. Based on control data indicating whether the beamformer 210 should be in a transmit mode of operation or a receive mode of operation, the digital controller 215 may produce switch control signals that control the states of switches (e.g., switches 160, 165, FIG. 1) in the transceiver channels 250-257. The switch control signals may cause the switches either to complete transmit paths between I/O ports (e.g., ports 158, 159, FIG. 1) of the transceivers 250-257, or to complete receive paths between the I/O ports of the transceivers 250-257.

Although not illustrated in FIG. 2, multiple control traces extend between the digital controller 215 and various components of the beamformer 210 (e.g., switches, attenuators, and phase shifters). Based on control data from the digital interface 214 indicating various phase shifts and/or attenuation levels that the transceiver channels 250-257 should apply, the digital controller 215 may convey phase shift control signals and attenuation control signals over the control traces. The phase shift control signals control the magnitudes of phase shifts applied to the RF signals by phase shifters (e.g., phase shifters 163, 168, FIG. 1) of the transceiver channels 250-257, and the attenuation control signals control the magnitudes of attenuation applied to the RF signals by attenuators (e.g., attenuators 162, 169, FIG. 1) of the transceiver channels 250-257.

The hybrid splitter/combiner circuit 230 includes a system-side I/O port 231, N channel-side I/O ports 232, 233, 234, 235, 236, 237, 238, 239, and first, second, and third splitter/combiner stages. The system-side I/O port 231 of the hybrid splitter/combiner circuit 230 is connected to the system-side I/O terminal 211 of the beamformer 210 (and thus to transceiver 290 and communications processing system 280). Conversely, each channel-side I/O port 232-239 of the hybrid splitter/combiner circuit 230 is connected to a different one of the transceiver channels 250-257.

The first, second, and third splitter/combiner stages are connected between the system-side I/O port 231 and the channel-side I/O ports 232-239. More specifically, the first splitter/combiner stage consists of a single "first-stage" splitter/combiner circuit 247, which includes a first I/O port connected to system-side I/O port 231, and two additional interior I/O ports 241, 242, each connected to a different splitter/combiner circuit 248, 249 of the second splitter/combiner stage. Accordingly, the first splitter/combiner stage (and the first-stage splitter/combiner circuit 247) is configured in the transmit mode of operation to split an RF signal received at I/O port 231 into two RF signals that are produced at the two interior I/O ports 241, 242, and is configured in the receive mode of operation to combine two RF signals received at the two interior I/O ports 241, 242 into a single RF signal that is produced at I/O port 231 (i.e., splitter/combiner circuit 247 functions as a 2:2 splitter or a 2:1 combiner).

The second splitter/combiner stage includes two "second-stage" splitter/combiner circuits 248, 249, which are connected in parallel between the first splitter/combiner stage (or ports 241, 242) and four additional interior I/O ports 243-246. More specifically, each second-stage splitter/combiner circuit 248, 249 includes a first I/O port corresponding to one of the two interior I/O ports 241, 242, and two additional channel-side ports 243/244, 245/246.

Accordingly, in the second splitter/combiner stage, one of the second-stage splitter/combiner circuits 248 is configured in the transmit mode of operation to split an RF signal received at interior I/O port 241 into two RF signals that are produced at interior I/O ports 243, 244, and is configured in the receive mode of operation to combine two RF signals at the two interior I/O ports 243, 244 into a single RF signal that is produced at the interior I/O port 241. Similarly, the other one of the two second-stage splitter/combiner circuits 249 is configured in the transmit mode of operation to split an RF signal received at interior I/O port 242 into two RF signals that are produced at interior I/O ports 245, 246, and is configured in the receive mode of operation to combine two RF signals at the two interior I/O ports 245, 246 into a single RF signal that is produced at interior I/O port 242. Accordingly, each of the second-stage splitter/combiner circuits 248, 249 functions as a 1:2 splitter or a 2:1 combiner, and the entire second splitter/combiner stage (consisting of circuits 248, 249) functions as a 2:4 splitter or a 4:2 combiner.

The third splitter/combiner stage includes four "third-stage" splitter/combiner circuits 261-264, which are connected in parallel between the second splitter/combiner stage (or ports 243-246) and 8 channel-side I/O ports 232-239. More specifically, each third-stage splitter/combiner circuit 261-264 includes a first I/O port corresponding to one of the four interior I/O ports 243-246, and two additional channel-side ports 232/233, 234/235, 236/237, 238/239.

Accordingly, in the third splitter/combiner stage, each of the third-stage splitter/combiner circuits 261-264 is configured in the transmit mode of operation to split an RF signal received at one of the interior I/O ports 243-246 into two RF signals that are produced at channel-side I/O ports 232/233, 234/235, 236/237, 238/239, and is configured in the receive mode of operation to combine two RF signals at the two channel-side I/O ports 232/233, 234/235, 236/237, 238/239 into RF signals that are produced at the interior I/O ports 243-246. Accordingly, each of the third-stage splitter/combiner circuits 261-264 functions as a 1:2 splitter or a 2:1 combiner, and the entire third splitter/combiner stage (consisting of circuits 261-264) functions as a 4:8 splitter or a 8:4 combiner. Additionally, the entire hybrid splitter/combiner circuit 230 functions as a 1:8 splitter or a 8:1 combiner.

Within hybrid splitter/combiner circuit 230, three different groupings of splitter/combiner circuits 261-264 may be defined as 1:4 splitters or 4:1 combiners, each of which may implement one of the hybrid splitter/combiner topologies depicted in FIGS. 4-9, which are described in detail below. More specifically, a first hybrid splitter/combiner circuit 240 includes first-stage splitter/combiner circuit 247 and second-stage splitter/combiner circuits 248, 249. A second hybrid splitter/combiner circuit 260 includes first-stage splitter/combiner circuit 248 and second-stage splitter/combiner circuits 261, 262. Finally, a third hybrid splitter/combiner circuit 265 includes first-stage splitter/combiner circuit 249 and second-stage splitter/combiner circuits 263, 264.

Each of the channel-side I/O ports 232-239 of the hybrid splitter/combiner circuit 230 is connected to a different system-side I/O port of the N transceiver channels 250-257. Further, each of the antenna-side I/O ports of the transceiver channels 250-257 is connected to a different antenna-side I/O terminal 220-227 of the beamformer 210. Each transceiver channel 250-257 may be configured similarly or identically to transceiver channel 150, described in detail above in conjunction with FIG. 1. For the sake of brevity, that description will not be repeated here, but is intended to be incorporated into this description of FIG. 2.

The antenna-side I/O terminals 220-227 of the beamformer 210 are coupled to the antenna elements 270-277 through conductive connections. According to an embodiment, the antenna elements 270-277 constitute an array of antenna elements. Again, although not depicted in FIG. 2, the array of antenna elements may include multiple rows and multiple columns of antenna elements (e.g., as shown in the bottom view 303 of the beamformer system 300 in FIG. 3). Further, each antenna element 270-277 may be implemented in the form of a rectangular or square patch antenna, with one or more connection points (e.g., connection point 278) proximate to one or more sides of each patch antenna.

According to an embodiment, communication system 200 supports single-polarization of transmitted or received RF signals, and all of the antenna-side I/O terminals 220-227 are connected to connection points 278 proximate to a first side of each antenna element 270-277 (or a connection point on an opposite, parallel, second side of each antenna element 270-277). This facilitates transmission or reception of an RF signal over the air interface in a single-polarized (e.g., H or V) manner.

Figure 3:
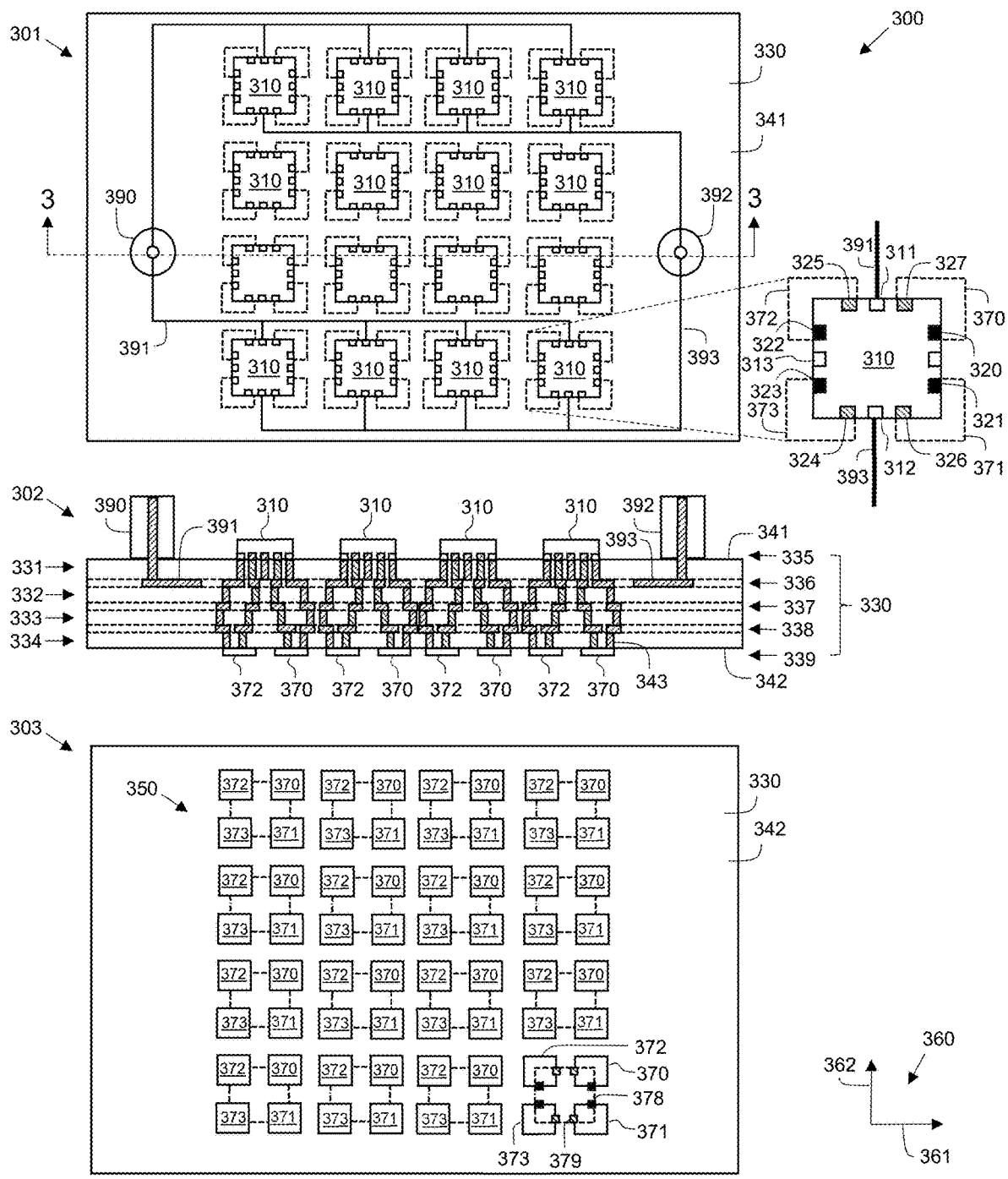
FIG. 3 illustrates top, side cross-sectional, and bottom views of a multi-channel, phased-array beamformer system, in accordance with an embodiment.

A physical implementation of an embodiment of a beamformer system is depicted in FIG. 3. More specifically, FIG. 3 illustrates a top view 301, a cross-sectional side view 302, and a bottom view 303 of a multi-channel, phased-array beamformer system 300, in accordance with an embodiment. Essentially, beamformer system 300 includes multiple instances of beamformer devices 310 (e.g., each corresponding to beamformer 110, FIG. 1) and multiple sets of antenna elements 370, 371, 372, 373 (e.g., each set corresponding to antenna elements 170-173, FIG. 1), as will be explained below. It should be noted at this point that the beamformer devices 310 and the antenna elements 370-373 are coupled to opposite sides of a substrate 330 so that a single beamformer device 310 may be aligned over a set of four antenna elements 370-373. To improve clarity, this alignment is indicated in the top view 301 by showing dashed-line antenna elements underlying each beamformer device 310. Further, this alignment is indicated in the bottom view 303 by showing dashed-line beamformer devices underlying each set of four antenna elements 370-373.

Beamformer system 300 is implemented on a substrate 330, which may include a multi-layer printed circuit board (PCB) or another suitable type of substrate. As shown in the side view 302, substrate 330 includes a plurality of dielectric layers 331, 332, 333, 334 and a plurality of patterned conductive layers 335, 336, 337, 338, 339 in an alternating arrangement. A first dielectric layer 331 defines a top surface 341 of the substrate 330, and a last dielectric layer 334 defines a bottom surface 342 of the substrate 330. Conductive vias (e.g., via 343) provide for electrical connectivity between conductive features of the patterned conductive layers 335-339. Although the substrate 330 depicted in FIG. 3 includes four dielectric layers 331-334 and five patterned conductive layers 335-339, other embodiments may include substrates with more or fewer dielectric and/or patterned conductive layers.

Referring to the bottom view 303, beamformer system 300 includes an array 350 of antenna elements 370-373 (e.g., multiple instances of antenna elements 170-173, FIG. 1) physically coupled to the bottom surface 342 of the substrate 330. For example, each antenna element in the array 350 may be formed from a portion of the patterned conductive layer 339 at the bottom surface 342 of the substrate 330. Alternatively, each antenna element may be a distinct conductive structure that is coupled to the bottom surface 342 of the substrate 330.

According to an embodiment, each antenna element 370-373 in the array 350 is implemented as a square patch antenna. Referring to coordinate system 360 in the bottom right corner of FIG. 3, each patch antenna element has two sides (or edges) that are parallel to axis 361, and two sides (or edges) that are parallel to axis 362. In other words, the two sides that are parallel to axis 361 are perpendicular to the two sides that are parallel to axis 362. Any set of touching, non-parallel sides may be referred to herein as being "adjacent" to each other.

The configuration of each antenna element 370-373 enables each antenna element to be utilized to transmit dual-polarized RF signals. More particularly, a contact point (e.g., point 378 or 178, FIG. 1) on one of the antenna element sides that is parallel to axis 361 may be coupled to a first beamformer terminal (e.g., terminal 320, 321, 322, or 323) associated with a first polarization (e.g., H or V polarization), and a contact point (e.g., point 379 or 179, FIG. 1) on an adjacent one of the sides that is parallel to axis 362 may be coupled to a second beamformer terminal (e.g., terminal 324, 325, 326, 327) associated with an orthogonal, second polarization (e.g., V or H polarization). As discussed previously in conjunction with FIGS. 1 and 2, in alternate embodiments, each antenna element may include only a single contact point (e.g., when the beamformer system is used to transmit single-polarized RF signals). Although FIG. 3 depicts an 8×8 array of antenna elements 370-373, beamformer system 300 may include more or fewer rows and/or columns of antenna elements, in other embodiments.

Beamformer system 300 also includes an array of beamformer devices 310 (e.g., each including the circuitry of beamformer 110, FIG. 1) that are physically coupled to the top surface 341 of the substrate 330. As most clearly shown in the enlarged beamformer device 310 to the right of the top view 301, each of the beamformer devices 310 may consist of a discrete, packaged semiconductor device with a plurality of terminals (or leads) 311, 312, 313, 320, 321, 322, 323, 324, 325, 326, 327 that facilitate electrical communication between circuitry external to the device, and circuitry internal to the device (e.g., an internal splitter/combiner circuit, a plurality of transceiver channels, and control circuitry). The beamformer devices 310 may be implemented using various types of electronic device packaging technologies, including flat no-leads (e.g., quad flat no-leads, QFN, dual flat no-leads, DFN), land grid array (LGA), flip-chip, or other suitable surface-mount packaging technologies.

For example, terminals 311 and 312 may correspond to system-side RF I/O terminals 111 and 112 of FIG. 1, and accordingly terminals 311 and 312 may be referred to herein as "system-side RF I/O terminals." In addition, terminals 320-327 may correspond to antenna-side RF I/O terminals 120-127 of FIG. 1, and accordingly terminals 320-327 may be referred to herein as "antenna-side RF I/O terminals." To enhance understandability, in the enlarged depiction of beamformer device 310 in FIG. 3, terminals 320-323 associated with the first polarization are shaded black, and terminals 324-327 associated with the second polarization are cross-hatched. Finally, terminal 313 may correspond to data/control terminal 113 of FIG. 1, and accordingly terminal 313 is configured to receive data and control signals from a communications processing system (e.g., system 180). Other terminals may be utilized to convey bias voltages, ground references, and other electrical signals. Although each device 310 is shown to include 12 terminals, other embodiments of beamformer devices may include more or fewer terminals.

To couple each beamformer device 310 to the substrate 330, the terminals 311, 312, 320-327 are physically and electrically connected (e.g., soldered or connected with conductive epoxy) to conductive pads formed from portions of the patterned conductive layer 335 at the top surface 341 of the substrate 330. Although FIG. 3 depicts a 4×4 array of beamformer devices 310, beamformer system 300 may include more or fewer rows and/or columns of devices 310, in other embodiments.

Once coupled to the substrate 330, the antenna-side RF I/O terminals 320-327 are electrically connected through the substrate 330 (e.g., through the conductive layers 335-339 and vias 343) to contact points (e.g., contact points 378, 379) of the antenna elements 370-373. More specifically, a first set of the antenna-side RF I/O terminals 320-323 associated with a first polarization are electrically connected to contact points 378 on sides of each antenna element 370-373 that are parallel with axis 361, and a second set of the antenna-side RF I/O terminals 324-327 associated with an orthogonal, second polarization are electrically connected to contact points 379 on sides of each antenna element 370-373 that are parallel with axis 362. Accordingly, each antenna element 370-373 has two contact points 378, 379 at two adjacent and perpendicular sides, and each contact point 378, 379 is coupled to a beamformer device terminal that is associated with a first polarization or an orthogonal, second polarization. Again, to enhance understandability, in the bottom view 303 of FIG. 3, contact points 378 associated with the first polarization are shaded black, and contact points 379 associated with the second polarization are cross-hatched.

Beamformer system 300 also includes first and second RF connectors 390, 392. The first RF connector 390 corresponds to an RF I/O configured to convey a first RF signal, and the second RF connector 392 corresponds to a second RF I/O configured to convey a second RF signal. When beamformer system 300 is electrically coupled to an external communication system, for example, the first RF connector 390 may be coupled to a first external transceiver (e.g., transceiver 190, FIG. 1), and the second RF connector 392 may be coupled to a second external transceiver (e.g., transceiver 192, FIG. 1).

As is most clearly illustrated in the top view 301 and the enlarged view of beamformer device 310 to the right of the top view 301, the first RF connector 390 is electrically coupled through conductive traces 391 on or within the substrate 330 (only some of which are illustrated in FIG. 3) to the first system-side RF I/O terminal 311 of each of the beamformer devices 310. Similarly, the second RF connector 392 is electrically coupled through conductive traces 393 (only some of which are illustrated in FIG. 3) to the second system-side RF I/O terminal 312 of each of the beamformer devices 310.

Figure 10:
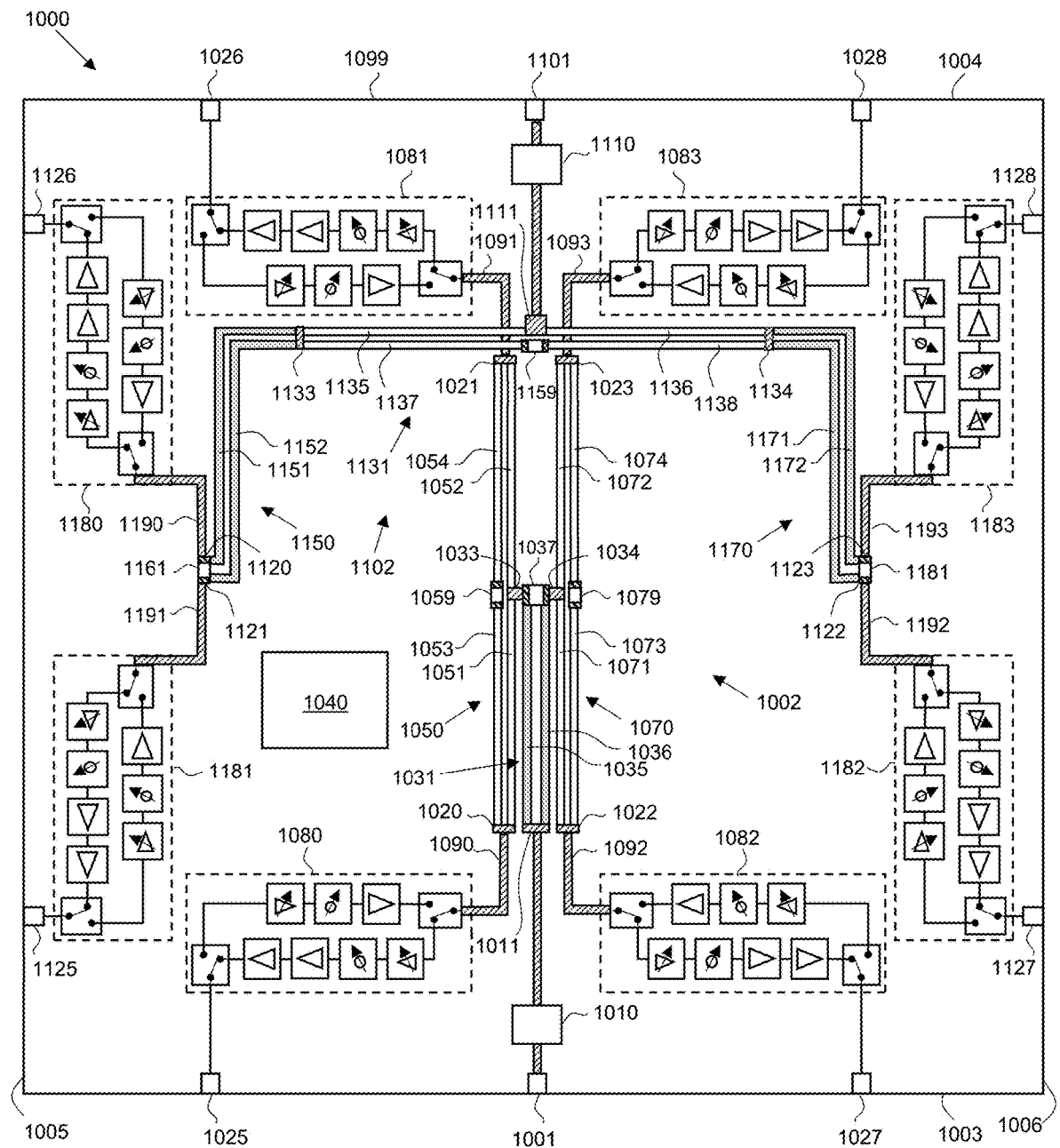
FIG. 10 illustrates a top view of an 8-channel phased-array beamformer IC that includes two different embodiments of hybrid splitter/combiner circuits, in accordance with an embodiment.

As was described previously, and as will be explained in greater detail in conjunction with FIG. 10, each beamforming device 310 also includes a digital data interface (e.g., SPI 114, FIG. 1) coupled to data/control terminal 313, and a digital controller (e.g., digital controller 115, FIG. 1) coupled to the digital data interface. Although not illustrated in FIG. 3, the beamformer system 300 also may include additional connectors (not illustrated) coupled to the substrate 330, along with additional traces formed from the conductive layers 335-338, which enable external data/control signals to be conveyed by external circuitry (e.g., communications processing system 180, FIG. 1) to the digital data interface of each beamforming device 310. The additional connector(s) and traces enable the beamforming devices 310 to be controlled to be in a transmit mode of operation or in a receive mode of operation at any given time. In addition, although not illustrated in FIG. 3, the beamformer system 300 also may include additional connectors coupled to the substrate 330, along with additional traces formed from the conductive layers 335-338, which enable bias voltages and ground reference connections to be provided to the circuitry within the beamforming devices 310.

To place the beamforming devices 310 in a transmit mode of operation, a control signal may be sent to the data/control terminal 313 of each of the beamforming devices 310, and in response, the internal digital controller (e.g., digital controller 115, FIG. 1) within each device 310 may send additional internal control signals to the transceiver channels (e.g., transceiver channels 150-157, FIG. 1) to configure the transceiver channels in the transmit mode of operation (e.g., by controlling switches 160, 165, FIG. 1, to connect the transmit path 161 between the I/O ports 158, 159 of the transceiver channel 150).

Once all of the beamforming devices 310 are configured in the transmit mode of operation, two distinct RF signals provided through the RF connectors 390, 392 are conveyed through traces 391, 393 to RF I/O terminals 311, 312 (e.g., terminals 111, 112, FIG. 1) of each beamforming device 310. As discussed previously, a first RF signal received through terminal 311 is then split into N/2 (e.g., 4) signals by a first internal splitter/combiner circuit (e.g., circuit 130, FIG. 1), and the N/2 signals each are conveyed through a different transceiver channel (e.g., through transceiver channels 150-153, FIG. 1) to an antenna-side RF I/O terminal 320-323 (e.g., terminals 120-123, FIG. 1). Those signals are then conveyed through the substrate 330 to first contact points 378 of N/2 antenna elements 370-373, and the N/2 antenna elements 370-373 radiate the RF signals over the air interface with a first polarization. In addition, a second RF signal received through terminal 313 is then split into N/2 (e.g., 4) signals by a second internal splitter/combiner circuit (e.g., circuit 140, FIG. 1), and the N/2 signals each are conveyed through a different transceiver channel (e.g., through transceiver channels 154-157, FIG. 1) to an antenna-side RF I/O terminal 324-327 (e.g., terminals 124-127, FIG. 1). Those signals are then conveyed through the substrate 330 to second contact points 379 of the same N/2 antenna elements 370-373, and the N/2 antenna elements 370-373 radiate the RF signals over the air interface with an orthogonal, second polarization.

To place the beamforming devices 310 in a receive mode of operation, a control signal may be sent to the data/control terminal 313 of each of the beamforming devices 310, and in response, the internal digital controller (e.g., digital controller 115, FIG. 1) within each device 310 may send additional internal control signals to the transceiver channels (e.g., transceiver channels 150-157, FIG. 1) to configure the transceiver channels in the receive mode of operation (e.g., by controlling switches 160, 165, FIG. 1, to connect the receive path 161 between the I/O ports 158, 159 of the transceiver channel 150).

Once all of the beamforming devices 310 are configured in the receive mode of operation, the N/2 antenna elements 370-373 convey RF signals received over the air interface through the substrate 330 to the antenna-side RF I/O terminals 320-327 of each beamforming device 310. More specifically, first components of the received RF signals that are associated with a first polarization are conveyed through the connection points 378 to the antenna-side RF I/O terminals 320-323, and second components of the received RF signals that are associated with an orthogonal, second polarization are conveyed through connection points 379 to the antenna-side RF I/O terminals 324-327.

Within each beamforming device 310, a first set of N/2 transceiver channels (e.g., transceiver channels 150-153, FIG. 1) convey the received first RF signal components through their respective receive paths (e.g. receive path 166, FIG. 1) to a first set of N/2 channel-side RF I/O ports (e.g., ports 132-135, FIG. 1) of a first splitter/combiner circuit (e.g., circuit 130, FIG. 1). The splitter/combiner circuit then combines the N/2 signals received through the channel-side RF I/O ports into a first RF signal, which is then conveyed through RF I/O terminal 311 and conductive traces 391 to the first RF connector 390. Similarly, a second set of N/2 transceiver channels (e.g., transceiver channels 154-157, FIG. 1) convey the received second RF signal components through their respective receive paths (e.g. receive path 166, FIG. 1) to a second set of N/2 channel-side RF I/O ports (e.g., ports 142, 143, 144, 145, FIG. 1) of a second splitter/combiner circuit (e.g., circuit 140, FIG. 1). The splitter/combiner circuit then combines the N/2 signals received through the channel-side RF I/O ports into a second RF signal, which is then conveyed through RF I/O terminal 312 and conductive traces 393 to the second RF connector 392.

Within each beamformer device 310, a beamformer integrated circuit (IC) includes the functional circuitry of the beamformer device (e.g., the circuitry within beamformer 110, 210, FIGS. 1, 2), and various ports within the beamformer IC are internally electrically coupled to the beamformer device terminals 311-313, 320-327 using wirebonds or other conductive connections. The package body may then be completed by overmolding the beamformer IC and wirebonds with molding compound, or by encapsulating the beamformer IC and wirebonds within an air cavity. As discussed above, the functional beamformer circuitry includes at least one splitter/combiner circuit (e.g., circuits 130, 140, 230, FIGS. 1, 2), a plurality of transceiver channels (e.g., transceiver channels 150-157, 250-257, FIGS. 1, 2), a digital data interface (e.g., SPI 114, 214, FIGS. 1, 2), and a digital controller (e.g., digital controller 115, 215, FIGS. 1, 2).

A number of specific hybrid splitter/combiner circuit embodiments that are suitable for use as any of the previously-discussed, 4-way splitter/combiner circuits (e.g., circuits 130, 140, 240, 260, 265, FIGS. 1, 2) will now be discussed in conjunction with FIGS. 4-10. The splitter/combiner circuit embodiments described in FIGS. 4-10 each provide a 1:4 splitting function (or 4:1 combining function). In other words, when operated as a splitter, an input RF signal received at a first RF I/O port (e.g., a system-side RF I/O port) will be divided by the splitter into four output RF signals provided at second through fifth RF I/O ports (e.g., channel-side RF I/O ports). Conversely, when operated as a combiner, four input RF signals provided at four RF I/O ports (e.g., channel-side RF I/O ports) will be combined by the combiner into a single RF signal provided at a fifth RF I/O port (e.g., a system-side RF I/O port).

To provide the 1:4 splitting function (or the 4:1 combining function), each of the below-described embodiments includes two splitter/combiner stages, although more splitter/combiner stages may be implemented as discussed in conjunction with FIG. 3. As discussed above in conjunction with FIGS. 1 and 2, a first stage provides a 1:2 splitting function (or 2:1 combining function), and a second stage provides a 2:4 splitting function (or a 4:2 combining function). According to various embodiments, the splitter/combiner circuits are considered to be "hybrid," because the first stage includes a first splitter/combiner circuit of a first "type," and the second stage includes two parallel-connected, splitter/combiner circuits of a different, second "type."

According to various embodiments, one of the two types of splitter/combiner circuits is a "Wilkinson-like" splitter/combiner circuit, and the other one of the two types of splitter/combiner circuits is a "Gysel-like" splitter/combiner circuit. Both the "Wilkinson-like" and "Gysel-like" splitter/combiner circuits function as in-phase splitters, according to an embodiment. In some embodiments, such as those illustrated in FIGS. 4-6, the first "type" of splitter/combiner circuit implemented in the first splitter/combiner stage is a single- or double-ended Wilkinson-like splitter/combiner circuit, and the second "type" of splitter/combiner circuit implemented in the second splitter/combiner stage is a single- or double-ended Gysel-like splitter/combiner circuit. In other embodiments, such as those illustrated in FIGS. 7-9, the first "type" of splitter/combiner circuit implemented in the first splitter/combiner stage is a Gysel-like splitter/combiner circuit, and the second "type" of splitter/combiner circuit implemented in the second splitter/combiner stage is a Wilkinson-like splitter/combiner circuit. As will be discussed later, FIG. 10 includes two embodiments of hybrid splitter/combiner circuits, where one of the hybrid splitter/combiner circuits corresponds to the embodiment depicted in FIG. 4, and the other one of the hybrid splitter/combiner circuits is similar to the embodiment depicted in FIG. 9.

An embodiment of a splitter/combiner circuit may be considered to be "Wilkinson-like" when the splitter/combiner circuit includes first, second, and third RF I/O ports, two quarter wave lines (or quarter wave transformers), and an isolation resistor. In such embodiments, each of the two quarter wave lines extends from the first RF I/O port to a different one of the second or third RF I/O ports. The second and third RF I/O ports are isolated (at the center frequency of operation) at their output nodes with the isolation resistor. In various embodiments, an isolation resistor may be, for example, a discrete, surface-mount component with first and second terminals that are configured to be physically and electrically connected (e.g., soldered) to conductive pads on the surface of the circuit substrate. In other embodiments, an isolation resistor may include an integrated resistor (i.e., a resistor integrally formed in a semiconductor or other substrate). Either way, each isolation resistor is characterized by a relatively-small physical distance between its first and second terminals. Given this configuration, the second and third RF I/O ports of a Wilkinson-like splitter/combiner circuit are relatively close together. More specifically, the second and third RF I/O ports are separated by a relatively small distance that may be approximately equal to the distance between the two terminals of the isolation resistor.

An embodiment of a splitter/combiner circuit may be considered to be "Gysel-like" when the splitter/combiner circuit includes first, second, and third RF I/O ports, a "ring" of multiple quarter wave lines (or quarter wave transformers), and one or more isolation resistors. In such embodiments, two of the quarter wave lines extend in different directions (e.g., directions that are 180 degrees apart) from the first RF I/O port to a different one of the second or third RF I/O ports. Additional quarter wave lines complete the remainder of the "ring" of quarter wave lines, and in various embodiments, the isolation resistor(s) are either terminated to ground through two isolated ports located around the ring (for a single-ended circuit) or are coupled across the differential circuits (for a double-ended circuit). Given these configurations, the second and third RF I/O ports are relatively far apart. More specifically, the second and third RF I/O ports are separated by a relatively large distance that may be approximately equal to the length of two of the quarter wave lines.

Each of the splitter/combiner circuit embodiments described herein may be implemented, for example, on a semiconductor or other type of substrate (e.g., substrate 1099, FIG. 10), and the various quarter wave lines of the splitter/combiner circuit embodiments may include printed or patterned conductive traces in or on the substrate, along with ground (shield) structures, in some embodiments. For example, the various quarter wave lines of the hybrid splitter/combiner circuits discussed herein may be implemented using any of a variety of types of transmission lines, including but not limited to microstrip, stripline, broadside coupled lines, coplanar waveguides, slow-wave coplanar waveguides, dual co-axial lines, and dual differential co-axial lines, to name a few. In the various "single-ended" splitter/combiner circuits described herein, each quarter wave line may be implemented with a type of transmission line that includes a single conductor referenced to ground, also referred to herein as an "unbalanced" transmission line. Conversely, in the various "double-ended" or "differential" splitter/combiner circuits described herein, each quarter wave line may be implemented with a type of transmission line that includes two conductors referenced against each other, also referred to herein as a "balanced" transmission line.

Each of the various quarter wave lines of the splitter/combiner circuit embodiments described herein are implemented as a 90 degree (or lambda/4) transmission lines, meaning that each quarter wave line has an electrical length of approximately 90 degrees (i.e., 90 degrees +/−10 degrees) at a fundamental frequency of operation of the circuit. Accordingly, each quarter wave line imparts approximately 90 degrees of phase delay to a fundamental frequency signal component (i.e., signal energy at the fundamental frequency of operation) that is conveyed between the first and second end of the quarter wave line. In some cases, a quarter wave line may be implemented using two or more shorter lines that are coupled together in series. Further, in some embodiments, one or more of the quarter wave lines may be implemented using "lumped" components. For example, a lumped component equivalent of a quarter wave line may include input and output nodes, a first shunt capacitor coupled between the input node and a ground reference, a series inductor with a first terminal coupled to the input node and a second terminal coupled to the output node, and a second shunt capacitor coupled between the output node and a ground reference. The term "quarter wave line," as used in this specification and the claims, may be interpreted to include a single transmission line, multiple series-coupled transmission lines, and/or a lumped component equivalent of a quarter wave transmission line.

Although each of the quarter wave lines illustrated in FIGS. 4-10 are shown to be straight (linear) between their ends, in other embodiments, at least some of the quarter wave lines may be "folded," meaning that some of the quarter wave lines may have a plurality of bends between their first and second ends. Desirably, when quarter wave lines that are arranged parallel to each other (e.g., quarter wave lines 414, 415, FIG. 4) are folded, the quarter wave lines would be substantially identical in shape or would be mirror-images of each other.

The splitter/combiner circuit embodiments described in FIGS. 4-10 each provide a 1:4 splitting function (or 4:1 combining function). In other words, when operated as a splitter, an input RF signal received at a first RF I/O port will be divided by the splitter into four output RF signals provided at four additional RF I/O ports. Conversely, when operated as a combiner, four input RF signals provided at four RF I/O ports will be combined by the combiner into a single input RF signal provided at a single, fifth RF I/O port. Because of their dual nature, each "port" that functions as an input or output port of the splitter/combiner circuit is referred to as an RF I/O port. That said, the splitter/combiner embodiments described herein alternatively may be utilized in a system as either a splitter or a combiner, but not both. Either way, the term "RF I/O port" may pertain to a port configured to function as an input and an output, a port configured to function only as an input, or a port configured to function only as an output.

To provide the 1:4 splitting function (or the 4:1 combining function), each of the below-described embodiments includes two splitter/combiner stages, as described previously. A first stage provides a 1:2 splitting function (or 2:1 combining function), and a second stage provides a 2:4 splitting function (or a 4:2 combining function). As will be described in more detail later, the second stage may include two parallel-connected, splitter/combiner circuits, each of which has a first RF I/O port that is coupled to a different one of two RF I/O ports of the first stage. In the embodiments illustrated in FIGS. 4-10, the splitter/combiner circuits of the second stage are identical to each other (e.g., both of the first type or the second type). In other embodiments, the splitter/combiner circuits of the second stage may be different from each other (e.g., one may be of the first type and the other may be of the second type, or either may be of a third type not specifically discussed herein).

Further, in some embodiments, one or more additional stages may be coupled to the second stage to increase the splitting/combining ratio. For example, as discussed previously, the splitter/combiner circuit 230 of FIG. 2 includes three stages, which provide a 1:8 splitting function (or an 8:1 combining function). Accordingly, although specific embodiments are illustrated in FIGS. 4-10 and described in detail herein, those specific embodiments are not meant to limit the scope of the inventive subject matter. Instead, based on the inventive subject matter discussed herein, one of skill in the art could design splitter/combiner circuits that have configurations that are different from the specifically illustrated and described embodiments.

In conjunction with FIGS. 4-9, the terms "system-side RF I/O port" and "channel-side RF I/O port" are used for convenience to indicate how the various hybrid splitter/combiner circuits may be coupled within an RF communication system (e.g., either of systems 100, 200, FIGS. 1, 2). Because the splitter/combiner circuits of FIGS. 4-9 may be incorporated into different types of electrical systems, it should be understood that the use of the terms "system-side" and "channel-side" are not meant to limit the scope of the inventive subject matter.

It should be noted that the embodiments of splitter/combiner circuits depicted in FIGS. 4-9 each include a plurality of quarter wave lines, which will be referred to below with the terms "first," "second," "third," and so on. The numerical identification of these lines herein is intended only to enhance the clarity of the description, and does not, in itself, imply a specific arrangement of the lines in the depicted splitter/combiner circuits. In addition, the numerical identification of these lines may not necessarily correspond to any numerical definition of quarter wave lines in the claims. Further, it should be understood that, in the below-described embodiments of single-ended hybrid splitter/combiner circuits (e.g., circuits 400, 700, FIG. 4, 7), each of the quarter wave lines may be implemented as an unbalanced transmission line. Conversely, in the below-described embodiments of double-ended hybrid splitter/combiner circuits (e.g., circuits 500, 600, 800, 900, 1000, FIG. 5, 6, 8, 9, 10), each of the quarter wave lines may be implemented as a balanced transmission line.

Figure 4:
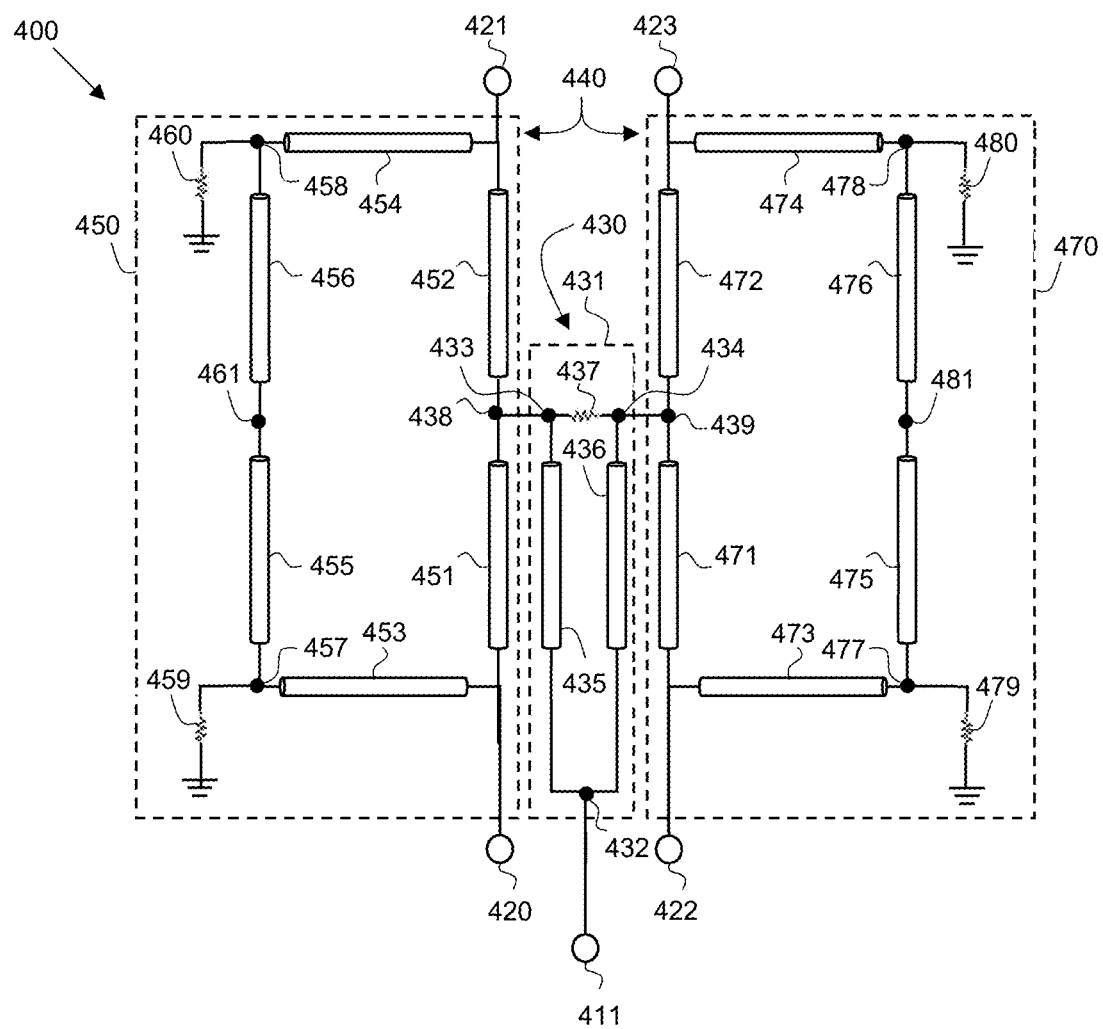
FIG. 4 illustrates a circuit diagram for a 4-way, single-ended, hybrid splitter/combiner circuit, in accordance with an embodiment.

FIG. 4 illustrates a circuit diagram for a 4-way, multiple-stage, single-ended, hybrid splitter/combiner circuit 400, in accordance with an embodiment. Hybrid splitter/combiner circuit 400 is suitable for use as any of the previously-discussed, 4-way splitter/combiner circuits (e.g., circuits 130, 140, 240, 260, 265, FIGS. 1, 2), and in other systems for which the splitter/combiner circuit 400 may be advantageous. Hybrid splitter/combiner circuit 400, which may be implemented on a semiconductor or other substrate (e.g., substrate 1099, FIG. 10), includes a system-side RF I/O port 411 and four channel-side RF I/O ports 420-423. When circuit 400 is being utilized as a splitter, the system-side RF I/O port 411 functions as an input port configured to receive an RF input signal that the circuit 400 will split into four RF output signals that are provided at the four channel-side RF I/O ports 420-423. Conversely, when circuit 400 is being utilized as a combiner, the four channel-side RF I/O ports 420-423 function as four input ports configured to receive four RF input signals that the circuit 400 will combine into a single RF output signal that is provided at the system-side RF I/O port 411.

In addition to the RF I/O ports 411, 420-423, circuit 400 also includes a first splitter/combiner stage 430 coupled to a second splitter/combiner stage 440. According to an embodiment, the first splitter/combiner stage 430 includes a first splitter/combiner circuit 431 (referred to as first-stage splitter/combiner circuit 431) that is "Wilkinson-like," as described above, and the second splitter/combiner stage 440 includes second and third splitter/combiner circuits 450, 470 (referred to as second-stage splitter/combiner circuits 450, 470) that are "Gysel-like," as also described above.

First stage splitter/combiner circuit 431 includes a first RF I/O port 432 coupled to the system-side RF I/O port 411, and second and third RF I/O ports 433, 434 (referred to herein as "interior" RF I/O ports). According to an embodiment, the first-stage splitter/combiner circuit 431 also includes two quarter wave lines 435, 436 that are straight, and physically positioned in parallel with each other across substantially their entire lengths, in an embodiment. In other embodiments, quarter wave lines 435, 436 may be "folded" in a symmetrical manner, and thus they may physically diverge from each other along some portions of their lengths. Each of the two quarter wave lines 435, 436 has a first end coupled to the first RF I/O port 432. A second end of the first quarter wave line 435 is coupled to the second RF I/O port 433, and a second end of the second quarter wave line 436 is coupled to the third RF I/O port 434.

According to an embodiment, the first-stage splitter/combiner circuit 431 also includes an isolation resistor 437 (e.g., 50 ohms, 100 ohms, or some other value) with first and second terminals. The first terminal of the isolation resistor 437 is coupled to the second RF I/O port 433 and also to the second end of the first quarter wave line 435. The second terminal of the isolation resistor 437 is coupled to the third RF I/O port 434 and also to the second end of the second quarter wave line 436. Since each terminal of isolation resistor 437 coupled between interior RF I/O ports 433, 434 is at the same potential, no current flows through the isolation resistor 437, and therefore the isolation resistor 437 is decoupled from the input. In some embodiments, the isolation resistor 437 may be a discrete component with a first terminal that is physically and electrically connected (e.g., soldered) to a first conductive node that corresponds to the second RF I/O port 433, and a second terminal that is physically and electrically connected to a second conductive node that corresponds to the third RF I/O port 434. In other embodiments, the isolation resistor 437 may be an integrated resistor (i.e., a resistor integrally formed in a semiconductor substrate). Either way, the isolation resistor 437 is characterized by a physical distance between its first and second terminals. According to an embodiment, the physical distance between the terminals of isolation resistor 437 is approximately equal to (or equal to) the distance between the second and third RF I/O ports 433, 434 of the first splitter/combiner circuit 431. In other words, the second and third RF I/O ports 433, 434 of the first splitter/combiner circuit 431 are separated by the width of the isolation resistor 437.

As illustrated in FIG. 4, the second-stage splitter/combiner circuits 450, 470 may have identical circuit configurations (e.g., they may both be of the same "type" of splitter/combiner circuit, and they both may have the same circuit components). In other embodiments, the second-stage splitter/combiner circuits may have different circuit configurations (e.g., they may be of different "types" from each other). According to the illustrated embodiment, the second-stage splitter/combiner circuits 450, 470 (referred to below as second and third splitter/combiner circuits 450, 470) each include a ring of quarter wave lines 451-456, 471-476, with channel-side RF I/O ports 420/421, 422/423 and isolated ports 457/458, 477/478 located around each ring at various points. According to an embodiment, each of the quarter wave lines 451-456, 471-476 is a straight transmission line. In other embodiments, various ones of quarter wave lines 451-456, 471-476 may be "folded," as defined above.

Within the second stage 440, the second splitter/combiner circuit 450 includes a first RF I/O port 438 (also referred to as an "interior" RF I/O port), the first channel-side RF I/O port 420, the second channel-side RF I/O port 421, two isolated ports 457, 458, and two termination resistors 459, 460. In some embodiments, the first RF I/O port 438 of circuit 450 may coincide with RF I/O port 433 of circuit 431, meaning that ports 438 and 433 correspond to a single conductive node. In other embodiments, interior RF I/O ports 433, 438 may be electrically coupled together with a conductive connection, which may include a minimal-phase transmission line up to an additional quarter wave transmission line. Either way, ports 433 and 438 are considered to be "electrically coupled," which includes being the same conductive node or being separated by a transmission line.

Third and fourth quarter wave lines 451, 452 of circuit 450 each are electrically coupled to interior RF I/O port 438 (and thus to port 433), and are physically oriented to extend in different directions (e.g., opposite or otherwise angularly separated directions), in an embodiment, in contrast with the first and second quarter wave lines 435, 436 of circuit 431, which extend in the same direction in parallel with each other. More specifically, each of the third and fourth quarter wave lines 451, 452 has a first end coupled to the interior RF I/O ports 438, 433. A second end of the third quarter wave line 451 is coupled to the first channel-side RF I/O port 420, and a second end of the fourth quarter wave line 452 is coupled to the second channel-side RF I/O port 421. According to an embodiment, the physical and electrical distance between the first and second channel-side RF I/O ports 420, 421 is approximately equal to (or equal to) the length of two quarter wave lines (specifically the distance between the second ends of quarter wave lines 451, 452 of the splitter/combiner circuit 450. In other words, the first and second channel-side RF I/O ports 420, 421 are physically and electrically separated by the combined length of two quarter wave lines.

A fifth quarter wave line 453 has a first end coupled to the first channel-side RF I/O port 420 (and to the second end of the third quarter wave line 451), and a second end coupled to a first isolated port 457. A sixth quarter wave line 454 has a first end coupled to the second channel-side RF I/O port 421 (and to the second end of the fourth quarter wave line 452), and a second end coupled to a second isolated port 458. A seventh quarter wave line 455 has a first end coupled to the first isolated port 457 (and to the second end of the fifth quarter wave line 453), and a second end coupled to a conductive node 461. An eighth quarter wave line 456 has a first end coupled to the second isolated port 458 (and to the second end of the sixth quarter wave line 454), and a second end coupled to the conductive node 461 (and to the second end of the seventh quarter wave line 455).

First and second termination resistors 459, 460 each have a first terminal coupled to a different one of the isolated ports 457, 458, and a second end coupled to a ground reference node. According to various embodiments, each of the first and second termination resistors 459, 460 may be implemented as a discrete component or an integrated resistor. In addition, the termination resistors 459, 460 may have the same resistance value (e.g., 50 ohms, 100 ohms, or some other value).

As mentioned above, the second and third splitter/combiner circuits 450, 470 may have identical circuit configurations. In the embodiment illustrated in FIG. 4, the second and third splitter/combiner circuits 450, 470 are mirror images of each other, which are disposed on opposite sides of the first splitter/combiner circuit 431.

Also within the second stage 440, the third splitter/combiner circuit 470 includes a first RF I/O port 439 (also referred to as an "interior" RF I/O port), the third channel-side RF I/O port 422, the fourth channel-side RF I/O port 423, two isolated ports 477, 478, and two termination resistors 479, 480. In some embodiments, the first RF I/O port 439 of circuit 470 may coincide with RF I/O port 434 of circuit 431, meaning that ports 439 and 434 correspond to a single conductive node. In other embodiments, interior RF I/O ports 434, 439 may be electrically coupled together with a conductive connection, which may include a minimal-phase transmission line up to an additional quarter wave transmission line. Either way, ports 434 and 439 are considered to be "electrically coupled," which includes being the same conductive node or being separated by a transmission line.

Ninth and tenth quarter wave lines 471, 472 of circuit 470 each are electrically coupled to interior RF I/O port 439 (and thus to port 434), and are physically oriented to extend in different directions (e.g., opposite or otherwise angularly separated directions), in an embodiment. More specifically, each of the ninth and tenth quarter wave lines 471, 472 has a first end coupled to the interior RF I/O ports 439, 434. A second end of the ninth quarter wave line 471 is coupled to the third channel-side RF I/O port 422, and a second end of the tenth quarter wave line 472 is coupled to the fourth channel-side RF I/O port 423. According to an embodiment, the physical and electrical distance between the third and fourth channel-side RF I/O ports 422, 423 is approximately equal to (or equal to) the length of two quarter wave lines (specifically the distance between the second ends of quarter wave lines 471, 472 of the splitter/combiner circuit 470. In other words, the third and fourth channel-side RF I/O ports 422, 423 are physically and electrically separated by the combined length of two quarter wave lines. As shown in FIG. 4, the system-side RF I/O port 411 is physically positioned between the first and third channel-side RF I/O ports 420, 422.

An eleventh quarter wave line 473 has a first end coupled to the third channel-side RF I/O port 422 (and to the second end of the ninth quarter wave line 471), and a second end coupled to a third isolated port 477. A twelfth quarter wave line 474 has a first end coupled to the fourth channel-side RF I/O port 423 (and to the second end of the tenth quarter wave line 472), and a second end coupled to a fourth isolated port 478. A thirteenth quarter wave line 475 has a first end coupled to the third isolated port 477 (and to the second end of the eleventh quarter wave line 473), and a second end coupled to a conductive node 481. A fourteenth quarter wave line 476 has a first end coupled to the fourth isolated port 478 (and to the second end of the twelfth quarter wave line 474), and a second end coupled to the conductive node 481 (and to the second end of the thirteenth quarter wave line 475).

Third and fourth termination resistors 479, 480 each have a first terminal coupled to a different one of the isolated ports 477, 478, and a second end coupled to a ground reference node. According to various embodiments, each of the third and fourth termination resistors 479, 480 may be implemented as a discrete component or an integrated resistor. In addition, the termination resistors 479, 480 may have the same resistance value (e.g., 50 ohms, 100 ohms, or some other value).

To perform a signal splitting operation, when a first RF signal is presented at the channel-side RF I/O port 411 of hybrid splitter/combiner circuit 400, the first RF signal is split by the first-stage splitter/combiner circuit 431 into equal-amplitude, equal-phase, second and third RF signals at interior RF I/O ports 433, 434. The second and third RF signals at interior RF I/O ports 433, 434 are presented at interior RF I/O ports 438, 439 of second-stage, hybrid splitter/combiner circuits 450, 470. The second RF signal is then split by the second-stage splitter/combiner circuit 450 into equal-amplitude, equal-phase, fourth and fifth RF signals at antenna-side RF I/O ports 420, 421. Similarly, the third RF signal is then split by the second-stage splitter/combiner circuit 470 into equal-amplitude, equal-phase, sixth and seventh RF signals at antenna-side RF I/O ports 422, 423. Essentially, the fourth through seventh RF signals at antenna-side RF I/O ports 420-423 also are equal-amplitude, equal-phase RF signals.

To perform a signal combining operation, first through fourth RF signals are presented at the antenna-side RF I/O ports 420-423. The first and second RF signals at ports 420, 421 are combined by second-stage splitter/combiner circuit 450 into a fifth RF signal at interior RF I/O ports 438, 433. Similarly, the third and fourth RF signals at ports 422, 423 are combined by second-stage splitter/combiner circuit 470 into a sixth RF signal at interior RF I/O ports 439, 434. The fifth and sixth RF signals at interior I/O ports 433, 434 are then combined by first-stage splitter/combiner circuit 431 into a seventh RF signal at channel-side RF I/O ports 432, 411.

FIG. 4 depicts a single-ended, hybrid splitter/combiner circuit 400, which includes a first splitter stage with a first type of splitter/combiner circuit (e.g., "Wilkinson-like"), and a second splitter stage with two instances of a second type of splitter/combiner circuits (e.g., "Gysel-like"). Similar splitter/combiner circuits may be implemented in a double-ended (or "differential" or "balanced") configuration, as will be discussed in conjunction with FIGS. 5 and 6. These differential splitter/combiner circuit embodiments may be preferable, for example, at very high millimeter wave frequencies (e.g., in the 40 gigahertz (GHz) and over range), although they may be used at lower frequencies, as well. As would be understood by those of skill in the art, based on the description herein, differential implementations may be less susceptible to routing issues, and also may avoid some potential issues associated with common mode signals. It should be noted that the difference between FIGS. 5 and 6 lies in the configuration of the splitter/combiner circuits in the second stage, as will be explained below. For brevity, FIGS. 5 and 6 will be discussed together, and like reference numbers will be used for like elements.

Figure 5:
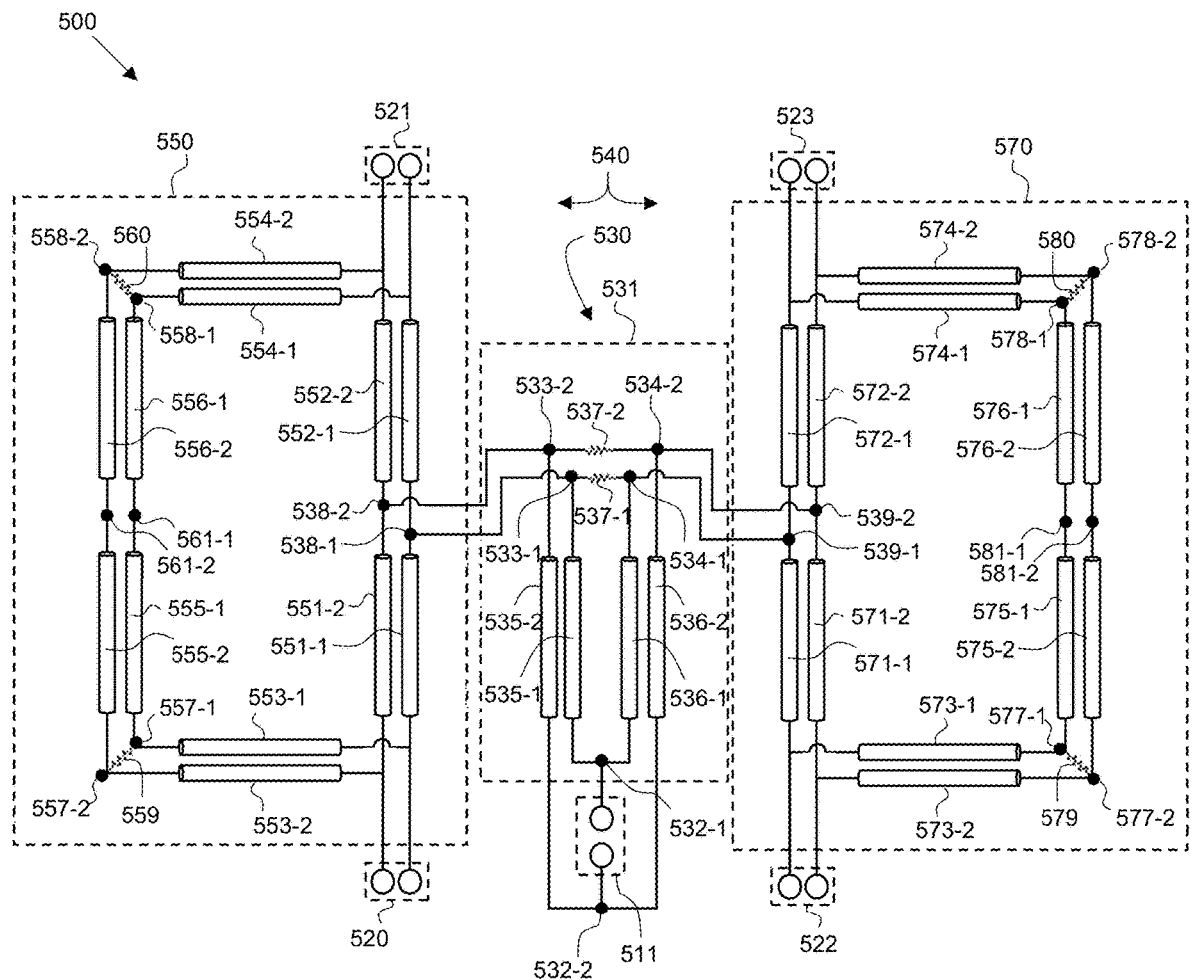
FIG. 5 illustrates a circuit diagram for a 4-way, double-ended, hybrid splitter/combiner circuit, in accordance with another embodiment.
Figure 6:
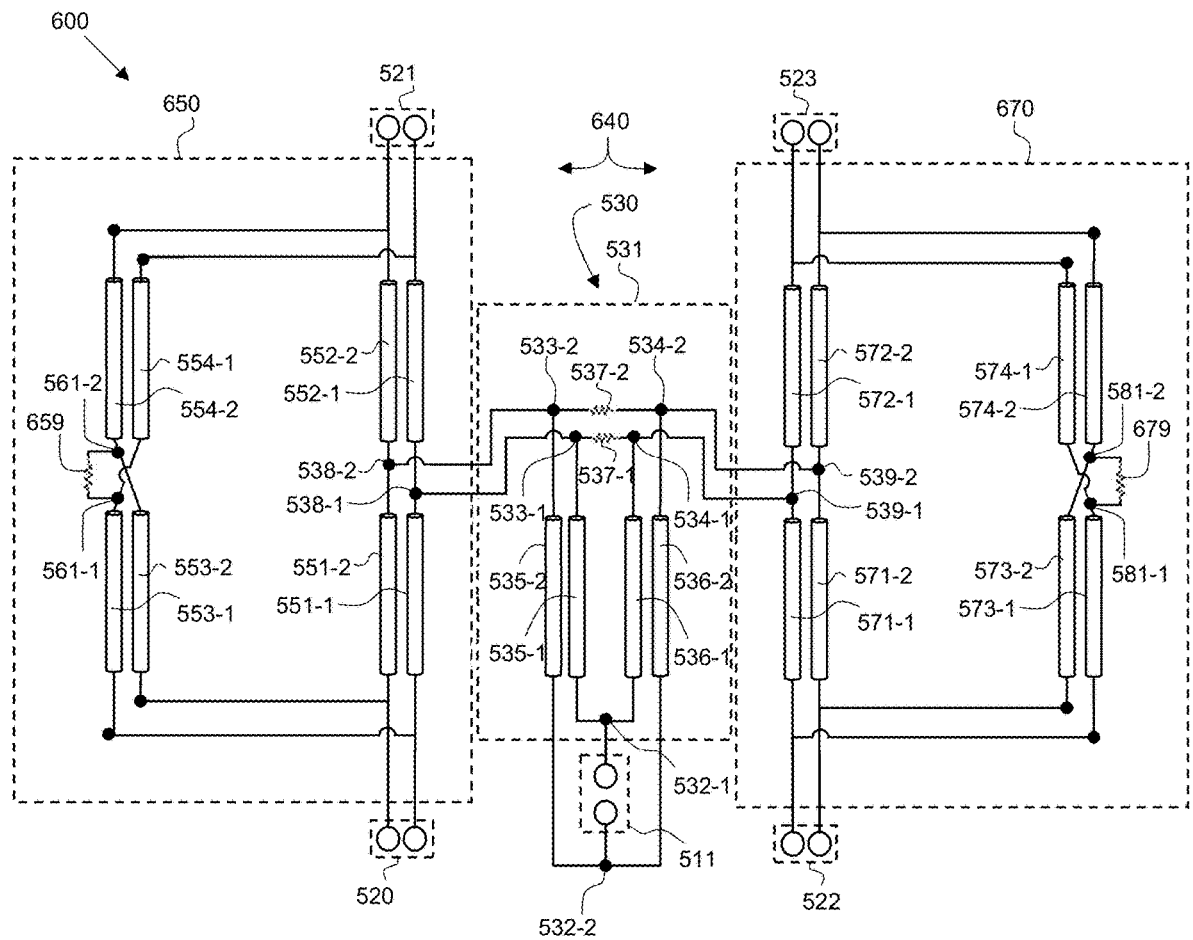
FIG. 6 illustrates a circuit diagram for a 4-way, double-ended, hybrid splitter/combiner circuit, in accordance with another embodiment.

More specifically, FIGS. 5 and 6 illustrate circuit diagrams for two embodiments of a 4-way, multiple-stage, differential, hybrid splitter/combiner circuit 500, 600. Hybrid splitter/combiner circuits 500, 600 each are suitable for use as any of the previously-discussed, 4-way splitter/combiner circuits (e.g., circuits 130, 140, 240, 260, 265, FIGS. 1, 2), and in other systems for which the splitter/combiner circuits 500, 600 may be advantageous. Hybrid splitter/combiner circuits 500, 600, either of which may be implemented on a semiconductor or other substrate (e.g., substrate 1099, FIG. 10), each include a system-side, double-ended RF I/O port 511 and four channel-side, double ended RF I/O ports 520-523. When circuit 500 or 600 is being utilized as a splitter, the system-side RF I/O port 511 functions as an input port configured to receive a differential RF input signal that the circuit 500 or 600 will split into four differential RF output signals that are provided at the four channel-side RF I/O ports 520-523. Conversely, when circuit 500 or 600 is being utilized as a combiner, the four channel-side RF I/O ports 520-523 function as four input ports configured to receive four differential RF input signals that the circuit 500 or 600 will combine into a single differential RF output signal that is provided at the system-side RF I/O port 511. It should be noted here that corresponding differential components of a particular differential feature (e.g., a differential transmission line or port) will be referred to using the same reference number, followed by a "-1" or "-2", and when the components of the same differential feature are discussed collectively, those components will be separated by a "/". For example, one particular "differential RF I/O port" has corresponding components 532-1/532-2, and one particular "differential quarter wave line" has corresponding components (e.g., parallel lines) 535-1/535-2.

In addition to the RF I/O ports 511, 520-523, circuits 500, 600 also include a first splitter/combiner stage 530 coupled to a second splitter/combiner stage 540 or 640. According to an embodiment, the first splitter/combiner stage 530 includes a first splitter/combiner circuit 531 that is "Wilkinson-like," as described above, and the second splitter/combiner stages 540, 640 each include second and third splitter/combiner circuits 550, 570 or 650, 670 that are "Gysel-like," as also described above.

In both of circuits 500, 600, the first-stage splitter/combiner circuit 531 includes a first differential RF I/O port 532-1/532-2 coupled to the system-side differential RF I/O port 511, and second and third differential RF I/O ports 533-1/533-2, 534-1/534-2 (referred to herein as "interior" RF I/O ports). According to an embodiment, the first-stage splitter/combiner circuit 531 also includes two differential quarter wave lines 535-1/535-2, 536-1/536-2 that are straight, and physically positioned in parallel with each other across substantially their entire lengths, in an embodiment. In other embodiments, differential quarter wave lines 535-1/535-2, 536-1/536-2 may be "folded" in a symmetrical manner, and thus they may physically diverge from each other along some portions of their lengths. Each of the two differential quarter wave lines 535-1/535-2, 536-1/536-2 has first ends coupled to a different differential component of the first differential RF I/O port 532-1/532-2. Second ends of the first differential quarter wave line 535-1/535-2 are coupled to different differential components of the second differential RF I/O port 533-1/533-2, and second ends of the second differential quarter wave line 536-1/536-2 are coupled to different differential components of the third differential RF I/O port 534-1/534-2.

According to an embodiment, the first-stage splitter/combiner circuit 531 also includes isolation resistors 537-1 and 537-2 (e.g., 50 ohms, 100 ohms, or some other value), each with first and second terminals. The first terminal of each isolation resistor 537-1 and 537-2 is coupled to a different differential component of the second differential RF I/O port 533-1/533-2 and also to a different second end of the first differential quarter wave line 535-1/535-2. The second terminal of each isolation resistor 537-1, 537-2 is coupled to a different differential component of the third RF I/O port 534-1/534-2 and also to a different second end of the second differential quarter wave line 536-1/536-2. As discussed previously, the isolation resistors 537-1, 537-2 may be discrete components or integrated resistors. Either way, the isolation resistors 537-1, 537-2 each are characterized by a physical distance between its first and second terminals. According to an embodiment, the physical distance between the terminals of each isolation resistor 537-1, 537-2 is approximately equal to (or equal to) the distance between the second and third RF I/O ports 533-1/533-2, 534-1/534-2 of the first splitter/combiner circuit 531. In other words, the second and third RF I/O ports 533-1/533-2, 534-1/534-2 of the first splitter/combiner circuit 531 are separated by the widths of the isolation resistors 537-1, 537-2.

In FIG. 5, the second-stage splitter/combiner circuits 550, 570 may have identical circuit configurations as each other (e.g., they may both be of the same "type" of splitter/combiner circuit, and they both may have the same circuit components). Similarly, in FIG. 6, the second-stage splitter/combiner circuits 650, 670 may have identical circuit configurations as each other. More particularly, as with previously-described embodiments, the second and third splitter/combiner circuits 550, 570 or 650, 660 may be mirror images of each other, which are disposed on opposite sides of the first splitter/combiner circuit 531. In other embodiments, the second-stage splitter/combiner circuits may have different circuit configurations (e.g., they may be of different "types" from each other).

According to the illustrated embodiments, the second-stage splitter/combiner circuits 550, 570 or 650, 670 (referred to below as second and third splitter/combiner circuits 550, 570 or 650, 670) each include a ring of differential quarter wave lines, first and second differential RF I/O ports 538-1/538-2, 539-1/539-2 (also referred to as "interior" RF I/O ports), and channel-side RF I/O ports 520/521, 522/523. In addition, the second and third splitter/combiner circuits 550, 570 or 650, 670 each include one or more differential conductive nodes 557-1/557-2, 558-1/558-2, 561-1/561-2, 577-1/577-2, 578-1/578-2, 581-1/581-2 located around each ring at various points. According to an embodiment, each of the quarter wave lines in circuits 550, 570, 650, 670 is a straight transmission line. In other embodiments, various ones of quarter wave lines in circuits 550, 570, 650, 670 may be "folded," as defined above.

In some embodiments, the first differential RF I/O port 538-1/538-2 of each circuit 550, 650 may coincide with differential RF I/O port 533-1/533-2 of circuit 531, meaning that ports 538-1/538-2 and 533-1/533-2 correspond to a single differential conductive node. Similarly, the second differential RF I/O port 539-1/539-2 of each circuit 570, 670 may coincide with differential RF I/O port 534-1/534-2 of circuit 531, meaning that ports 539-1/539-2 and 534-1/534-2 correspond to a single differential conductive node. In other embodiments, interior RF I/O ports 533-1/533-2, 538-1/538-2 may be electrically coupled together with a differential conductive connection, and interior RF I/O ports 534-1/534-2, 539-1/539-2 may be electrically coupled together with another differential conductive connection, each of which may include a minimal-phase differential transmission line up to an additional differential quarter wave transmission line. Either way, ports 533-1/533-2 and 538-1/538-2 and ports 534-1/534-2, 539-1/539-2 are considered to be "electrically coupled," which includes being the same conductive differential node or being separated by a differential transmission line.

In circuits 550, 650, third and fourth differential quarter wave lines 551-1/551-2, 552-1/552-2 each are electrically coupled to interior differential RF I/O port 538-1/538-2 (and thus to port 533-1/533-2), and these differential quarter wave lines are physically oriented to extend in different directions (e.g., opposite or otherwise angularly separated directions), in an embodiment, in contrast with the first and second differential quarter wave lines 535-1/535-2, 536-1/536-2 of circuit 531, which extend in the same direction in parallel with each other. More specifically, each of the third and fourth differential quarter wave lines 551-1/551-2, 552-1/552-2 has a first end coupled to a different differential component of the interior RF I/O ports 538-1/538-2, 533-1/533-2. A second end of each of the third differential quarter wave lines 551-1/551-2 is coupled to a different differential component of the first channel-side differential RF I/O port 520, and a second end of each of the fourth differential quarter wave lines 552-1/552-2 is coupled to a different differential component of the second channel-side RF I/O port 521. According to an embodiment, the physical and electrical distance between the first and second channel-side RF I/O ports 520, 521 is approximately equal to (or equal to) the length of two quarter wave lines (specifically the distance between the second ends of quarter wave lines 551-1/551-2, 552-1/552-2 of the splitter/combiner circuit 550. In other words, the first and second channel-side RF I/O ports 520, 521 are physically and electrically separated by the combined length of two quarter wave lines.

Similarly, in circuits 570, 670, fifth and sixth differential quarter wave lines 571-1/571-2, 572-1/572-2 each are electrically coupled to interior differential RF I/O port 539-1/539-2 (and thus to port 534-1/534-2), and these differential quarter wave lines are physically oriented to extend in different directions (e.g., opposite or otherwise angularly separated directions). More specifically, each of the fifth and sixth differential quarter wave lines 571-1/571-2, 572-1/572-2 has a first end coupled to a different differential component of the interior RF I/O ports 539-1/539-2, 534-1/534-2. A second end of each of the fifth differential quarter wave lines 571-1/571-2 is coupled to a different differential component of the third channel-side differential RF I/O port 522, and a second end of each of the sixth differential quarter wave lines 572-1/572-2 is coupled to a different differential component of the fourth channel-side RF I/O port 523. According to an embodiment, the physical and electrical distance between the third and fourth channel-side RF I/O ports 522, 523 is approximately equal to (or equal to) the length of two quarter wave lines (specifically the distance between the second ends of quarter wave lines 571-1/571-2, 572-1/572-2 of the splitter/combiner circuit 570. In other words, the first and second channel-side RF I/O ports 522, 523 are physically and electrically separated by the combined length of two quarter wave lines. As shown in FIGS. 5 and 6, the system-side RF I/O port 511 is physically positioned between the first and third channel-side RF I/O ports 520, 522.

Differences between the embodiments of FIGS. 5 and 6 will now be discussed. Referring now specifically to circuit 550, a seventh differential quarter wave line 553-1/553-2 has first ends coupled to different differential components of the first channel-side RF I/O port 520 (and to the second ends of the third differential quarter wave line 551-1/551-2), and second ends coupled to different differential components of a first differential conductive node 557-1/557-2. An eighth differential quarter wave line 554-1/554-2 has first ends coupled to the second channel-side RF I/O port 521 (and to the second ends of the fourth differential quarter wave line 552-1/552-2), and second ends coupled to different differential components of a second differential conductive node 558-1/558-2.

Similarly, in circuit 570, a ninth differential quarter wave line 573-1/573-2 has first ends coupled to different differential components of the third channel-side RF I/O port 522 (and to the second ends of the fifth differential quarter wave line 571-1/571-2), and second ends coupled to different differential components of a third differential conductive node 577-1/577-2. A tenth differential quarter wave line 574-1/574-2 of each circuit 570, 670 has first ends coupled to the fourth channel-side RF I/O port 523 (and to the second ends of the sixth differential quarter wave line 572-1/572-2), and second ends coupled to different differential components of a fourth differential conductive node 578-1/578-2.

In circuit 550, an eleventh differential quarter wave line 555-1/555-2 has first ends coupled to different differential components of the first differential conductive node 557-1/557-2 (and to the second ends of the seventh differential quarter wave line 553-1/553-2), and second ends coupled to a fifth differential conductive node 561-1/561-2. A twelfth differential quarter wave line 556-1/556-2 has first ends coupled to different differential components of the second differential conductive node 558-1/558-2 (and to the second ends of the eighth differential quarter wave line 554-1/554-2), and second ends coupled to the different differential components of the fifth differential conductive node 561-1/561-2 (and to the second ends of the eleventh differential quarter wave line 555-1/555-2).

Similarly, in circuit 570, a thirteenth differential quarter wave line 575-1/575-2 has first ends coupled to different differential components of the third differential conductive node 577-1/577-2 (and to the second ends of the ninth differential quarter wave line 573-1/573-2), and second ends coupled to a sixth differential conductive node 581-1/581-2. A fourteenth differential quarter wave line 576-1/576-2 has first ends coupled to different differential components of the fourth differential conductive node 578-1/578-2 (and to the second ends of the tenth differential quarter wave line 574-1/574-2), and second ends coupled to the different differential components of the sixth differential conductive node 581-1/581-2 (and to the second ends of the thirteenth differential quarter wave line 575-1/575-2).

In the embodiment of FIG. 5, circuit 550 also includes two isolation resistors 559, 560, each of which is coupled across a different one of the first and second differential conductive nodes 557-1/557-2 or 558-1/558-2. Additionally, circuit 570 also includes two isolation resistors 579, 580, each of which is coupled across a different one of the third and fourth differential conductive nodes 577-1/577-2 or 578-1/578-2.

Referring now to the embodiment of FIG. 6, it is immediately apparent that each of circuits 650, 670 has two fewer differential lines than the number of differential lines in circuits 550, 570 (FIG. 5). More specifically, circuit 650 includes a seventh differential quarter wave line 553-1/553-2 with first ends coupled to different differential components of the first channel-side RF I/O port 520 (and to the second ends of the third differential quarter wave line 551-1/551-2), and second ends coupled to different differential components of a first differential conductive node 561-1/561-2. An eighth differential quarter wave line 554-1/554-2 has first ends coupled to the second channel-side RF I/O port 521 (and to the second ends of the fourth differential quarter wave line 552-1/552-2), and second ends coupled to different differential components of the first differential conductive node 561-1/561-2.

Similarly, in circuit 670, a ninth differential quarter wave line 573-1/573-2 has first ends coupled to different differential components of the third channel-side RF I/O port 522 (and to the second ends of the fifth differential quarter wave line 571-1/571-2), and second ends coupled to different differential components of a second differential conductive node 581-1/581-2. A tenth differential quarter wave line 574-1/574-2 has first ends coupled to different differential components of the fourth channel-side RF I/O port 523 (and to the second ends of the sixth differential quarter wave line 572-1/572-2), and second ends coupled to different differential components of the second differential conductive node 581-1/581-2.

In the embodiment of FIG. 6, circuits 650, 670 each also include a single isolation resistor 659, 679 cross-coupled across the first or second differential conductive node 561-1/561-2 or 581-1/581-2. According to various embodiments, each of the isolation resistors 659, 679 may be implemented as a discrete component or an integrated resistor (e.g., each having a value of 50 ohms, 100 ohms, or some other value). Implementing the isolation resistors 659, 679 in this manner enables the "Gysel-like" circuits 650, 670 of FIG. 6 to be smaller and potentially more compact than the "Gysel-like" circuits 550, 570 of FIG. 5, by reducing the number of differential transmission lines in each loop.

Figure 7:
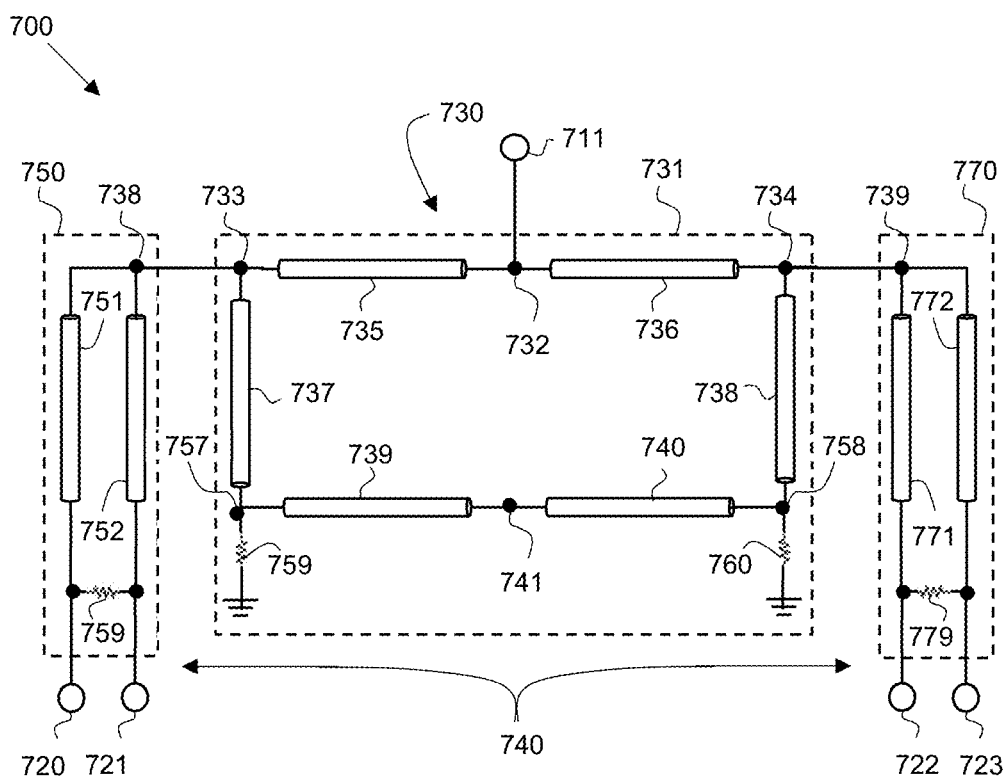
FIG. 7 illustrates a circuit diagram for a 4-way, single-ended, hybrid splitter/combiner circuit, in accordance with another embodiment.
Figure 8:
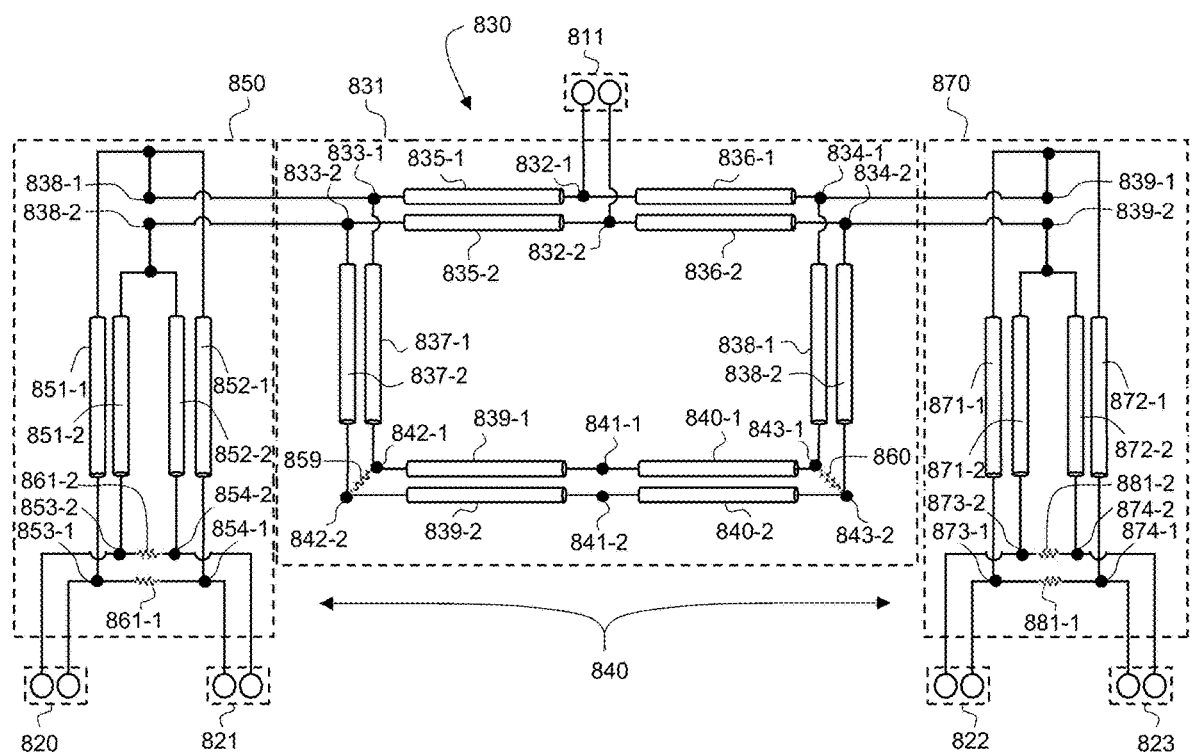
FIG. 8 illustrates a circuit diagram for a 4-way, double-ended, hybrid splitter/combiner circuit, in accordance with another embodiment.
Figure 9:
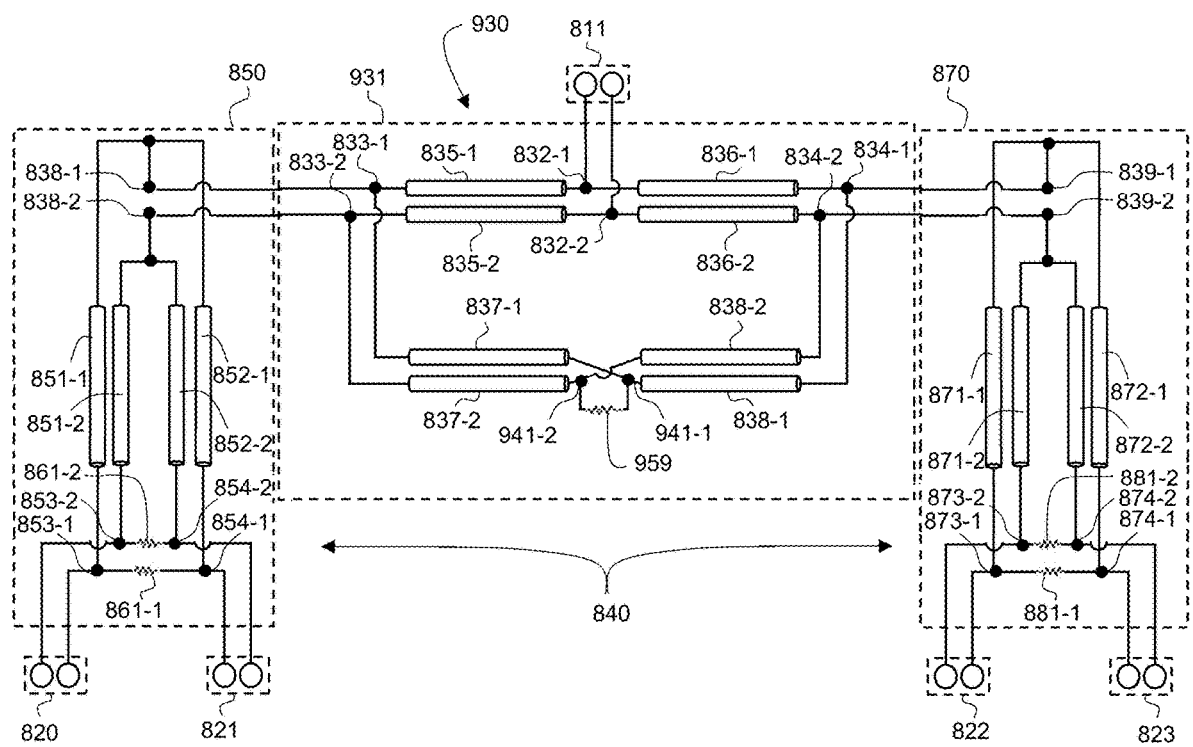
FIG. 9 illustrates a circuit diagram for a 4-way, double-ended, hybrid splitter/combiner circuit, in accordance with another embodiment.

In the embodiments of FIGS. 7-9, the first splitter/combiner stages 730, 830 each includes a first splitter/combiner circuit 731, 831 that is "Wilkinson-like," as described above, and a second splitter/combiner stage 740, 840, 940 that includes second and third splitter/combiner circuits 750, 850, 950, 770, 870, 970 that are "Gysel-like," as also described above. In alternate embodiments, such as those illustrated in FIGS. 7-9, a hybrid splitter/combiner circuit instead may include a first splitter/combiner stage that includes a "Gysel-like" splitter-combiner circuit, and a second splitter/combiner stage that includes two splitter/combiner stages that are "Wilkinson-like."

Starting first with FIG. 7, a circuit diagram is illustrated for a 4-way, multiple-stage single-ended, hybrid splitter/combiner circuit 700, in accordance with an embodiment. Hybrid splitter/combiner circuit 700 is suitable for use as any of the previously-discussed, 4-way splitter/combiner circuits (e.g., circuits 130, 140, 240, 260, 265, FIGS. 1, 2), and in other systems for which the splitter/combiner circuit 700 may be advantageous. Hybrid splitter/combiner circuit 700, which may be implemented on a semiconductor or other substrate (e.g., substrate 1099, FIG. 10), includes a system-side RF I/O port 711 and four channel-side RF I/O ports 720-723. When circuit 700 is being utilized as a splitter, the system-side RF I/O port 711 functions as an input port configured to receive an RF input signal that the circuit 700 will split into four RF output signals that are provided at the four channel-side RF I/O ports 720-723. Conversely, when circuit 700 is being utilized as a combiner, the four channel-side RF I/O ports 720-723 function as four input ports configured to receive four RF input signals that the circuit 700 will combine into a single RF output signal that is provided at the system-side RF I/O port 711.

In addition to the RF I/O ports 711, 720-723, circuit 700 also includes a first splitter/combiner stage 730 coupled to a second splitter/combiner stage 740. According to an embodiment, the first splitter/combiner stage 730 includes a first splitter/combiner circuit 731 (referred to as first-stage splitter/combiner circuit 731) that is "Gysel-like," as described above, and the second splitter/combiner stage 740 includes second and third splitter/combiner circuits 750, 770 (referred to as second-stage splitter/combiner circuits 750, 770) that are "Wilkinson-like," as also described above.

First stage splitter/combiner circuit 731 includes an RF I/O port 732 coupled to the system-side RF I/O port 711, and second and third RF I/O ports 733, 734 (referred to herein as "interior" RF I/O ports). According to an embodiment, the first-stage splitter/combiner circuit 731 also includes a ring of quarter wave lines 735-740, with RF I/O ports 733, 734 and isolated ports 757, 758 located around each ring at various points. According to an embodiment, each of the quarter wave lines 735-740 is a straight transmission line. In other embodiments, various ones of quarter wave lines 735-740 may be "folded," as defined above.

More specifically, within the first stage 730, a first splitter/combiner circuit 731 includes a first system-side RF I/O port 732, second and third RF I/O ports 733, 734 (also referred to as "interior" RF I/O ports), two isolated ports 757, 758, and two termination resistors 759, 760. First and second quarter wave lines 735, 736 of circuit 731 are electrically coupled to RF I/O port 732 (and thus to port 711), and are physically oriented to extend in different directions (e.g., opposite or otherwise angularly separated directions), in an embodiment. More specifically, each of the first and second quarter wave lines 735, 736 has a first end coupled to the RF I/O port 732. A second end of the first quarter wave line 735 is coupled to the first interior RF I/O port 733, and a second end of the second quarter wave line 736 is coupled to the second interior RF I/O port 734. According to an embodiment, the physical and electrical distance between the first and second interior RF I/O ports 733, 734 is approximately equal to (or equal to) the length of two quarter wave lines (specifically the distance between the second ends of quarter wave lines 735, 736 of the first splitter/combiner circuit 731. In other words, the first and second interior RF I/O ports 733, 734 are physically and electrically separated by the combined length of two quarter wave lines.

A third quarter wave line 737 has a first end coupled to the first interior RF I/O port 733 (and to the second end of the first quarter wave line 735), and a second end coupled to a first isolated port 757. A fourth quarter wave line 738 has a first end coupled to the second interior RF I/O port 734 (and to the second end of the second quarter wave line 736), and a second end coupled to a second isolated port 758. A fifth quarter wave line 739 has a first end coupled to the first isolated port 757 (and to the second end of the third quarter wave line 737), and a second end coupled to a conductive node 741. A sixth quarter wave line 740 has a first end coupled to the second isolated port 758 (and to the second end of the fourth quarter wave line 738), and a second end coupled to the conductive node 741 (and to the second end of the fifth quarter wave line 755).

First and second termination resistors 759, 760 each have a first terminal coupled to a different one of the isolated ports 757, 758, and a second end coupled to a ground reference node. According to various embodiments, each of the first and second termination resistors 759, 760 may be implemented as a discrete component or an integrated resistor. In addition, the termination resistors 759, 760 may have the same resistance value (e.g., 50 ohms, 100 ohms, or some other value).

As illustrated in FIG. 7, the second-stage splitter/combiner circuits 750, 770 may have identical circuit configurations (e.g., they may both be of the same "type" of splitter/combiner circuit, and they both may have the same circuit components). In other embodiments, the second-stage splitter/combiner circuits may have different circuit configurations (e.g., they may be of different "types" from each other). According to the illustrated embodiment, the second-stage splitter/combiner circuits 750, 770 (referred to below as second and third splitter/combiner circuits 750, 770) each include two quarter wave lines 751, 752, 771, 772 and an isolation resistor 759, 779. According to an embodiment, each of the quarter wave lines 751, 752, 771, 772 is a straight transmission line. In other embodiments, various ones of quarter wave lines 751, 752, 771, 772 may be "folded," as defined above.

Within the second stage 740, the second splitter/combiner circuit 750 includes a first RF I/O port 738 (also referred to as an "interior" RF I/O port), the first channel-side RF I/O port 720, the second channel-side RF I/O port 721, and one isolation resistor 759. In some embodiments, the first RF I/O port 738 of circuit 750 may coincide with RF I/O port 733 of circuit 731, meaning that ports 738 and 733 correspond to a single conductive node. In other embodiments, interior RF I/O ports 733, 738 may be electrically coupled together with a conductive connection, which may include a minimal-phase transmission line up to an additional quarter wave transmission line. Either way, ports 733 and 738 are considered to be "electrically coupled," which includes being the same conductive node or being separated by a transmission line.

According to an embodiment, the second splitter/combiner circuit 750 also includes two quarter wave lines 751, 752 (or seventh and eighth quarter wave lines) that are straight, and physically positioned in parallel with each other across substantially their entire lengths, in an embodiment. In other embodiments, quarter wave lines 751, 752 may be "folded" in a symmetrical manner, and thus they may physically diverge from each other along some portions of their lengths. Each of the two quarter wave lines 751, 752 has a first end coupled to the first interior RF I/O port 738 (and thus to port 733). A second end of the seventh quarter wave line 751 is coupled to the second RF I/O port 720, and a second end of the eighth quarter wave line 752 is coupled to the third RF I/O port 721.

According to an embodiment, the second splitter/combiner circuit 750 also includes an isolation resistor 759 (e.g., 50 ohms, 100 ohms, or some other value) with first and second terminals. The first terminal of the isolation resistor 759 is coupled to the second RF I/O port 720 and also to the second end of the seventh quarter wave line 751. The second terminal of the isolation resistor 759 is coupled to the third RF I/O port 721 and also to the second end of the eighth quarter wave line 752. Since each terminal of isolation resistor 759 coupled between RF I/O ports 720, 721 is at the same potential, no current flows through the isolation resistor 759, and therefore the isolation resistor 759 is decoupled from the input. In some embodiments, the isolation resistor 759 may be a discrete component with a first terminal that is physically and electrically connected (e.g., soldered) to a first conductive node that corresponds to the second RF I/O port 720, and a second terminal that is physically and electrically connected to a second conductive node that corresponds to the third RF I/O port 721. In other embodiments, the isolation resistor 759 may be an integrated resistor (i.e., a resistor integrally formed in a semiconductor substrate). Either way, the isolation resistor 759 is characterized by a physical distance between its first and second terminals. According to an embodiment, the physical distance between the terminals of isolation resistor 759 is approximately equal to (or equal to) the distance between the second and third RF I/O ports 720, 721 of the second splitter/combiner circuit 750. In other words, the second and third RF I/O ports 720, 721 of the second splitter/combiner circuit 750 are separated by the width of the isolation resistor 759.

As mentioned above, the second and third splitter/combiner circuits 750, 770 may have identical circuit configurations. In the embodiment illustrated in FIG. 7, the second and third splitter/combiner circuits 750, 770 are mirror images of each other, which are disposed on opposite sides of the first splitter/combiner circuit 731.

Also within the second stage 740, the third splitter/combiner circuit 770 includes a first RF I/O port 739 (also referred to as an "interior" RF I/O port), the third channel-side RF I/O port 722, the fourth channel-side RF I/O port 723, and isolation resistor 779. In some embodiments, the first RF I/O port 739 of circuit 770 may coincide with RF I/O port 734 of circuit 731, meaning that ports 739 and 734 correspond to a single conductive node. In other embodiments, interior RF I/O ports 734, 739 may be electrically coupled together with a conductive connection, which may include a minimal-phase transmission line up to an additional quarter wave transmission line. Either way, ports 734 and 739 are considered to be "electrically coupled," which includes being the same conductive node or being separated by a transmission line.

According to an embodiment, the third splitter/combiner circuit 770 also includes two quarter wave lines 771, 772 (or ninth and tenth quarter wave lines) that are straight, and physically positioned in parallel with each other across substantially their entire lengths, in an embodiment. In other embodiments, quarter wave lines 771, 772 may be "folded" in a symmetrical manner, and thus they may physically diverge from each other along some portions of their lengths. Each of the two quarter wave lines 771, 772 has a first end coupled to the second interior RF I/O port 739 (and thus to port 734). A second end of the ninth quarter wave line 771 is coupled to the fourth RF I/O port 722, and a second end of the tenth quarter wave line 772 is coupled to the fifth RF I/O port 723.

According to an embodiment, the third splitter/combiner circuit 770 also includes an isolation resistor 779 (e.g., 50 ohms, 100 ohms, or some other value) with first and second terminals. The first terminal of the isolation resistor 779 is coupled to the fourth RF I/O port 722 and also to the second end of the ninth quarter wave line 771. The second terminal of the isolation resistor 779 is coupled to the fifth RF I/O port 723 and also to the second end of the tenth quarter wave line 772. Since each terminal of isolation resistor 779 coupled between RF I/O ports 722, 723 is at the same potential, no current flows through the isolation resistor 779, and therefore the isolation resistor 779 is decoupled from the input. In some embodiments, the isolation resistor 779 may be a discrete component with a first terminal that is physically and electrically connected (e.g., soldered) to a first conductive node that corresponds to the fourth RF I/O port 722, and a second terminal that is physically and electrically connected to a second conductive node that corresponds to the fifth RF I/O port 723. In other embodiments, the isolation resistor 779 may be an integrated resistor (i.e., a resistor integrally formed in a semiconductor substrate). Either way, the isolation resistor 779 is characterized by a physical distance between its first and second terminals. According to an embodiment, the physical distance between the terminals of isolation resistor 779 is approximately equal to (or equal to) the distance between the fourth and fifth RF I/O ports 722, 723 of the third splitter/combiner circuit 770. In other words, the fourth and fifth RF I/O ports 722, 723 of the third splitter/combiner circuit 770 are separated by the width of the isolation resistor 779.

To perform a signal splitting operation, when a first RF signal is presented at the channel-side RF I/O port 711 of hybrid spitter/combiner circuit 700, the first RF signal is split by the first-stage splitter/combiner circuit 731 into equal-amplitude, equal-phase, second and third RF signals at interior RF I/O ports 733, 734. The second and third RF signals at interior RF I/O ports 733, 734 are presented at interior RF I/O ports 738, 739 of second-stage, hybrid splitter/combiner circuits 750, 770. The second RF signal is then split by the second-stage splitter/combiner circuit 750 into equal-amplitude, equal-phase, fourth and fifth RF signals at antenna-side RF I/O ports 720, 721. Similarly, the third RF signal is then split by the second-stage splitter/combiner circuit 770 into equal-amplitude, equal-phase, sixth and seventh RF signals at antenna-side RF I/O ports 722, 723. Essentially, the fourth through seventh RF signals at antenna-side RF I/O ports 720-723 also are equal-amplitude, equal-phase RF signals.

To perform a signal combining operation, first through fourth RF signals are presented at the antenna-side RF I/O ports 720-723. The first and second RF signals at ports 720, 721 are combined by second-stage splitter/combiner circuit 750 into a fifth RF signal at interior RF I/O ports 738, 733. Similarly, the third and fourth RF signals at ports 722, 723 are combined by second-stage splitter/combiner circuit 770 into a sixth RF signal at interior RF I/O ports 739, 734. The fifth and sixth RF signals at interior I/O ports 733, 734 are then combined by first-stage splitter/combiner circuit 731 into a seventh RF signal at channel-side RF I/O ports 732, 711.

FIG. 7 depicts a single-ended, hybrid splitter/combiner circuit 700, which includes a first splitter stage with a first type of splitter/combiner circuit (e.g., "Gysel-like"), and a second splitter stage with two instances of a second type of splitter/combiner circuits (e.g., "Wilkinson-like"). Similar splitter/combiner circuits may be implemented in a double-ended (or "differential") configuration, as will be discussed in conjunction with FIGS. 8 and 9. As discussed previously, these differential splitter/combiner circuit embodiments may be preferable, for example, at very high millimeter wave frequencies (e.g., in the 40 GHz and over range), although they may be used at lower frequencies, as well. As would be understood by those of skill in the art, based on the description herein, differential implementations may be less susceptible to routing issues, and also may avoid some potential issues associated with common mode signals. It should be noted that the difference between FIGS. 8 and 9 lies in the configuration of the splitter/combiner circuits in the first stage, as will be explained below. For brevity, FIGS. 8 and 9 will be discussed together, and like reference numbers will be used for like elements.

More specifically, FIGS. 8 and 9 illustrate circuit diagrams for two embodiments of a 4-way, multiple-stage, differential, hybrid splitter/combiner circuit 800, 900. Hybrid splitter/combiner circuits 800, 900 each are suitable for use as any of the previously-discussed, 4-way splitter/combiner circuits (e.g., circuits 130, 140, 240, 260, 265, FIGS. 1, 2), and in other systems for which the splitter/combiner circuits 800, 900 may be advantageous. Hybrid splitter/combiner circuits 800, 900, either of which may be implemented on a semiconductor or other substrate (e.g., substrate 1099, FIG. 10), each include a system-side, double-ended RF I/O port 811 and four channel-side, double ended RF I/O ports 820-823. When circuit 800 or 900 is being utilized as a splitter, the system-side RF I/O port 811 functions as an input port configured to receive a differential RF input signal that the circuit 800 or 900 will split into four differential RF output signals that are provided at the four channel-side RF I/O ports 820-823. Conversely, when circuit 800 or 900 is being utilized as a combiner, the four channel-side RF I/O ports 820-823 function as four input ports configured to receive four differential RF input signals that the circuit 800 or 900 will combine into a single differential RF output signal that is provided at the system-side RF I/O port 811. Again, corresponding differential components of a particular differential feature (e.g., a differential transmission line or port) will be referred to using the same reference number, followed by a "−1" or "−2", and when the components of the same differential feature are discussed collectively, those components will be separated by a "/".

In addition to the RF I/O ports 811, 820-823, circuits 800, 900 also include a first splitter/combiner stage 830 or 930 coupled to a second splitter/combiner stage 840. According to an embodiment, the first splitter/combiner stages 830, 930 each include a first splitter/combiner circuit 831, 931 that is "Gysel-like," as described above, and the second splitter/combiner stages 840 each include second and third splitter/combiner circuits 850, 870 that are "Wilkinson-like," as also described above. In the embodiments of FIGS. 8 and 9, the first splitter/combiner stages 830, 930 are different from each other, and the second splitter/combiner stages 840 are substantially the same.

Both first splitter/combiner stages 830, 930 include a first-stage splitter/combiner circuit 831, 931 (referred to below as first splitter/combiner circuits 831, 931). According to the illustrated embodiments, the first splitter/combiner circuits 831 or 931 each include a first differential RF I/O port 832-1, 832-2 coupled to different differential components of the system-side RF I/O port 811. In addition, the first splitter/combiner circuits each include second and third differential RF I/O ports 833-1/833-2, 834-1/834-2 (referred to herein as "interior" RF I/O ports). In addition, each of the first splitter/combiner circuits 831, 931 includes a ring of differential quarter wave lines, and one or more differential conductive nodes 841-1/841-2, 842-1/842-2, 843-1/843-2 located around each ring at various points. According to an embodiment, each of the quarter wave lines in circuits 831, 931 is a straight transmission line. In other embodiments, various ones of quarter wave lines in circuits 831, 931 may be "folded," as defined above.

More specifically, within the first stages 830, 930, each of the first splitter/combiner circuits 831, 931 includes first and second differential quarter wave lines 835-1/835-2, 836-1/836-2, which are physically oriented to extend in different directions (e.g., opposite or otherwise angularly separated directions), in an embodiment. The first and second differential quarter wave lines 835-1/835-2, 836-1/836-2 have first ends that are coupled to different differential components of the first differential RF I/O port 832-1/832-2 (and to the different differential components of the system-side RF I/O port 811). The second ends of the first differential quarter wave lines 835-1, 835-2 are coupled to different differential components of the first interior RF I/O port 833-1/833-2. The second ends of the second differential quarter wave lines 836-1/836-2 are coupled to different differential components of the second interior RF I/O port 834-1/834-2. According to an embodiment, the physical and electrical distance between the first and second interior RF I/O ports 833-1/833-2, 834-1/834-2 is approximately equal to (or equal to) the length of two quarter wave lines (specifically the distance between the second ends of quarter wave lines 835-1/835-2, 836-1/836-2 of the first splitter/combiner circuits 831, 931. In other words, the first and second interior RF I/O ports 833-1/833-2, 834-1/834-2 are physically and electrically separated by the combined length of two quarter wave lines.

Differences between the embodiments of FIGS. 8 and 9 will now be discussed. Referring now specifically to circuit 831, a third differential quarter wave line 837-1/837-2 has first ends coupled to different differential components of the first interior RF I/O port 833-1/833-2 (and to the second ends of the first differential quarter wave line 835-1/835-2), and second ends coupled to a first differential conductive node 842-1/842-2. A fourth differential quarter wave line 838-1/838-2 has first ends coupled to different differential components of the second interior RF I/O port 834-1/834-2 (and to the second ends of the second differential quarter wave line 836-1/836-2), and second ends coupled to the different differential components of a second differential conductive node 843-1/843-2.

In addition, a fifth differential quarter wave line 839-1/839-2 has first ends coupled to different differential components of the first differential conductive node 842-1/842-2 (and to the second ends of the third differential quarter wave line 837-1/837-2), and second ends coupled to a third differential conductive node 841-1/841-2. A sixth differential quarter wave line 840-1/840-2 has first ends coupled to different differential components of the second differential conductive node 843-1/843-2 (and to the second ends of the fourth differential quarter wave line 838-1/838-2), and second ends coupled to the different differential components of the third differential conductive node 841-1/841-2 (and to the second ends of the fifth differential quarter wave line 839-1/839-2). In the embodiment of FIG. 8, circuit 831 also includes two isolation resistors 859, 860, each of which is coupled across a different one of the first and second differential conductive nodes 842-1/842-2 or 843-1/843-2. The isolation resistors 859, 860 each may be implemented as a discrete component or an integrated resistor (e.g., each having a value of 50 ohms, 100 ohms, or some other value).

Referring now to the embodiment of FIG. 9, it is immediately apparent that circuit 931 has two fewer differential lines than the number of differential lines in circuit 831 (FIG. 8). More specifically, circuit 931 includes a third quarter wave line 837-1/837-2 with first ends coupled to different differential components of the first interior RF I/O port 833-1/833-2 (and to the second ends of the first differential quarter wave line 835-1/835-2), and second ends coupled to different differential components of a first differential conductive node 941-1/941-2. A fourth differential quarter wave line 838-2/838-2 has first ends coupled to the second interior RF I/O port 834-1/834-2 (and to the second ends of the second differential quarter wave line 836-1/836-2), and second ends coupled to different differential components of the first differential conductive node 941-1/941-2.

In the embodiment of FIG. 9, circuit 931 also includes a single isolation resistor 959 cross-coupled across the first differential conductive node 941-1/941-2. According an embodiment, the isolation resistor 959 may be implemented as a discrete component or an integrated resistor (e.g., having a value of 50 ohms, 100 ohms, or some other value). Implementing the isolation resistor 959 in this manner enables the "Gysel-like" circuit 931 of FIG. 9 to be smaller and potentially more compact than the "Gysel-like" circuit 831 of FIG. 8, by reducing the number of differential transmission lines in the loop.

In both FIGS. 8 and 9, the second-stage splitter/combiner circuits 850, 870 may have identical circuit configurations as each other (e.g., they may both be of the same "type" of splitter/combiner circuit, and they both may have the same circuit components). More particularly, as with previously-described embodiments, the second and third splitter/combiner circuits 850, 870 may be mirror images of each other, which are disposed on opposite sides of the first splitter/combiner circuit 831 or 931. In other embodiments, the second-stage splitter/combiner circuits may have different circuit configurations (e.g., they may be of different "types" from each other).

According to the illustrated embodiments, the second-stage splitter/combiner circuits 850, 870 (referred to below as second and third splitter/combiner circuits 850, 870) each include two differential quarter wave lines, a differential RF I/O port 838-1/838-2, 839-1/839-2 (also referred to as "interior" RF I/O ports), and channel-side RF I/O ports 820/821, 822/823. According to an embodiment, each of the quarter wave lines in circuits 850, 870 is a straight transmission line. In other embodiments, various ones of quarter wave lines in circuits 850, 870 may be "folded," as defined above.

In some embodiments, the differential RF I/O port 838-1/838-2 of each circuit 850 may coincide with differential RF I/O port 833-1/833-2 of circuit 831, meaning that ports 838-1/838-2 and 833-1/833-2 correspond to a single differential conductive node. Similarly, the differential RF I/O port 839-1/839-2 of each circuit 870 may coincide with differential RF I/O port 834-1/834-2 of circuit 831, meaning that ports 839-1/839-2 and 834-1/834-2 correspond to a single differential conductive node. In other embodiments, interior RF I/O ports 833-1/833-2, 838-1/838-2 may be electrically coupled together with a differential conductive connection, and interior RF I/O ports 834-1/834-2, 839-1/839-2 may be electrically coupled together with another differential conductive connection, each of which may include a minimal-phase differential transmission line up to an additional differential quarter wave transmission line. Either way, ports 833-1/833-2 and 838-1/838-2 and ports 834-1/834-2, 839-1/839-2 are considered to be "electrically coupled," which includes being the same conductive differential node or being separated by a differential transmission line.

In each of circuits 800, 900, each of the second-stage splitter/combiner circuits 850, 870 also includes two differential quarter wave lines 851-1/851-2, 852-1/852-2, 871-1/871-2, 872-1/872-2 that are straight, and physically positioned in parallel with each other across substantially their entire lengths, in an embodiment. In other embodiments, differential quarter wave lines 851-1/851-2, 852-1/852-2, 871-1/871-2, 872-1/872-2 may be "folded" in a symmetrical manner, and thus they may physically diverge from each other along some portions of their lengths.

In each circuit 850, each of the differential quarter wave lines 851-1/851-2, 852-1/852-2 has first ends coupled to a different differential component of the differential RF I/O port 838-1/838-2 (and thus to the second ends of the first differential quarter wave lines 835-1/835-2 and the first ends of the third differential quarter wave lines 837-1/837-2). Second ends of the differential quarter wave line 851-1/851-2 are coupled to different differential components of differential RF I/O port 853-1/853-2. Similarly, second ends of the differential quarter wave line 852-1/852-2 are coupled to different differential components of differential RF I/O port 854-1/854-2. The different differential components of differential RF I/O port 853-1/853-2 are coupled to different differential components of the first channel-side RF I/O port 820, and the different differential components of differential RF I/O port 854-1/854-2 are coupled to different differential components of the second channel-side RF I/O port 821.

According to an embodiment, each second splitter/combiner circuit 850 also includes isolation resistors 861-1 and 861-2 (e.g., 50 ohms, 100 ohms, or some other value), each with first and second terminals. The first terminal of each isolation resistor 861-1 and 861-2 is coupled to a different differential component of the differential RF I/O port 853-1/853-2 (and thus to the first channel-side RF I/O port 820) and also to a different second end of the differential quarter wave line 851-1/851-2. The second terminal of each isolation resistor 861-1, 861-2 is coupled to a different differential component of the differential RF I/O port 854-1/854-2 (and thus to the second channel-side RF I/O port 821) and also to a different second end of the differential quarter wave line 852-1/852-2. As discussed previously, the isolation resistors 861-1, 861-2 may be discrete components or integrated resistors. Either way, the isolation resistors 861-1, 861-2 each are characterized by a physical distance between its first and second terminals. According to an embodiment, the physical distance between the terminals of each isolation resistor 861-1, 861-2 is approximately equal to (or equal to) the distance between the RF I/O ports 853-1/853-2, 854-1/854-2, or the physical distance between the first and second, channel-side RF I/O ports 820, 821 of the second splitter/combiner circuit 850. In other words, RF I/O ports 853-1/853-2, 854-1/854-2 and channel-side RF I/O ports 820, 821 of the second splitter/combiner circuit 850 are separated by the widths of the isolation resistors 861-1, 861-2.

Similarly, in each circuit 870, each of the differential quarter wave lines 871-1/871-2, 872-1/872-2 has first ends coupled to a different differential component of the differential RF I/O port 839-1/839-2 (and thus to the second ends of the second differential quarter wave lines 836-1/836-2 and the first ends of the fourth differential quarter wave lines 838-1/838-2). Second ends of the differential quarter wave line 871-1/871-2 are coupled to different differential components of differential RF I/O port 873-1/873-2. Similarly, second ends of the differential quarter wave line 872-1/872-2 are coupled to different differential components of differential RF I/O port 874-1/874-2. The different differential components of differential RF I/O port 873-1/873-2 are coupled to different differential components of the third channel-side RF I/O port 822, and the different differential components of differential RF I/O port 874-1/874-2 are coupled to different differential components of the fourth channel-side RF I/O port 823.

According to an embodiment, each third splitter/combiner circuit 870 also includes isolation resistors 881-1 and 881-2 (e.g., 50 ohms, 100 ohms, or some other value), each with first and second terminals. The first terminal of each isolation resistor 881-1 and 881-2 is coupled to a different differential component of the differential RF I/O port 873-1/873-2 (and thus to the third channel-side RF I/O port 822) and also to a different second end of the differential quarter wave line 871-1/871-2. The second terminal of each isolation resistor 881-1, 881-2 is coupled to a different differential component of the differential RF I/O port 874-1/874-2 (and thus to the fourth channel-side RF I/O port 823) and also to a different second end of the differential quarter wave line 872-1/872-2. As discussed previously, the isolation resistors 881-1, 881-2 may be discrete components or integrated resistors. Either way, the isolation resistors 881-1, 881-2 each are characterized by a physical distance between its first and second terminals. According to an embodiment, the physical distance between the terminals of each isolation resistor 881-1, 881-2 is approximately equal to (or equal to) the distance between the RF I/O ports 873-1/873-2, 874-1/874-2, or the physical distance between the third and fourth, channel-side RF I/O ports 822, 823 of the third splitter/combiner circuit 870. In other words, RF I/O ports 873-1/873-2, 874-1/874-2 and channel-side RF I/O ports 822, 823 of the third splitter/combiner circuit 870 are separated by the widths of the isolation resistors 881-1, 881-2.

FIGS. 4-9 depicted multiple embodiments of hybrid splitter/combiner circuits 400, 500, 600, 700, 800, 900. Each of these hybrid splitter/combiner circuit embodiments may be implemented in actual hardware, along with various transceivers and other components, in the form of a phased-array beamformer IC. For example, FIG. 10 illustrates a top view of an 8-channel phased-array beamformer IC 1000 (e.g., any one of beamformer ICs 110, 310, FIGS. 1, 3) that includes two different hybrid splitter/combiner circuits 1002, 1102 (e.g., circuits 130, 140, 600, 900, FIGS. 1, 6, 9), in accordance with an embodiment. To incorporate the beamformer IC 1000 into an electronic system (e.g., beamformer system 300, FIG. 3), the beamformer IC 1000 may be packaged in a suitable device package, such as a flat no-leads package (e.g., QFN, DFN), an LGA package, a flip-chip package, or another suitable surface-mount package, in order to convert the beamformer IC 1000 into a suitable surface-mount device (e.g., device 310, FIG. 3).

Essentially, the beamformer IC 1000 implements two separate and electrically-isolated, two-stage, hybrid splitter/combiner circuits 1002, 1102 that are arranged to occupy different areas of the beamformer IC 1000. One of the hybrid splitter/combiner circuits 1102 forms a portion of a first 4-channel phased-array beamformer (e.g., associated with a first polarization), and the other hybrid splitter/combiner circuit 1102 forms a portion of a second 4-channel phased-array beamformer (e.g., associated with a second polarization). As would be understood by one of skill in the art, based on the description herein, other embodiments of a beamformer IC may include only one of the 4-channel phased-array beamformers, or may include two identical 4-channel phased-array beamformers, or may include multiple hybrid splitter/combiner circuits that are associated with a single polarization.

The beamformer IC 1000 includes a substrate 1099, in and on which the various circuit elements of the beamformer IC 1000 are formed. For example, the substrate 1099 may be a semiconductor substrate, such as a silicon-based substrate (e.g., silicon, silicon-germanium, silicon-on-insulator, and so on), a gallium-based substrate (e.g., gallium arsenide, gallium nitride (GaN), GaN on silicon, GaN on silicon carbide (SiC), and so on), or another suitable semiconductor substrate. In other embodiments, the beamformer IC 1000 may be formed in and on a printed circuit board (PCB) or other suitable substrate. Either way, the substrate 1099 is defined by a top surface (as shown in FIG. 10), a bottom surface, and four sides 1003-1006.

The various quarter wave lines of the hybrid splitter/combiner circuits discussed herein may be implemented using any of a variety of types of transmission lines, including but not limited to broadside coupled lines, coplanar waveguides, slow-wave coplanar waveguides, dual co-axial lines, and dual differential co-axial lines, to name a few.

The first 4-channel phased-array beamformer includes a first system-side RF I/O terminal 1001 (e.g., terminal 111, 312 FIGS. 1, 3), a first hybrid splitter/combiner circuit 1002, four transceiver channels 1080, 1081, 1082, 1083 (e.g., transceiver channels 150-153, FIG. 1), and four channel-side RF I/O terminals 1025-1028 (e.g., terminals 120-123, 324-326, FIGS. 1, 3). The first hybrid splitter/combiner circuit 1002 is depicted to be a double-ended (differential) splitter/combiner circuit, which essentially has the same or similar structure as hybrid splitter/combiner circuit 600 (FIG. 6). In other embodiments, the first hybrid splitter/combiner circuit 1002 may be a differential circuit that has the same or similar structure as hybrid splitter/combiner circuit 500 (FIG. 5). For simplicity of illustration, each of the differential lines in the first hybrid splitter/combiner circuit 1002 is illustrated as single conductor. In such an embodiment, the first 4-channel phased-array beamformer also may include a system-side balun 1010 coupled between the system-side RF I/O terminal 1001 and the first hybrid splitter/combiner circuit 1002, along with four channel-side baluns (not illustrated) coupled between the four channel-side RF I/O ports 1020-1023 of the first hybrid splitter/combiner circuit 1002 and the four transceivers 1080-1083. The system-side balun 1010 is configured to convert between unbalanced signals at the first system-side RF I/O terminal 1001 and balanced (differential) signals processed by the first hybrid splitter/combiner circuit 1002. Similarly, each of the channel-side baluns is configured to convert between unbalanced signals processed by the transceivers 1080-1083 and balanced signals processed by the first hybrid splitter/combiner circuit 1002. In other embodiments, the first hybrid splitter/combiner circuit 1002 may be implemented as a single-ended hybrid splitter/combiner circuit (e.g., having a same or similar structure as hybrid splitter/beamformer circuit 400, FIG. 4), and the system-side and channel-side baluns may be excluded.

As mentioned above, the first hybrid splitter/combiner circuit 1002 essentially has a similar structure as hybrid splitter/combiner circuit 600 (FIG. 6). For brevity, the intricate details of hybrid splitter/combiner circuit 600 will not be repeated here, but those details are intended to be incorporated into the below description of hybrid splitter/combiner circuit 1002. The first hybrid splitter/combiner circuit 1002 has a system-side RF I/O port 1011 (e.g., port 511, FIG. 6) and four channel-side RF I/O ports 1020-1023 (e.g., ports 620-623, FIG. 6). In addition, the first hybrid splitter/combiner circuit 1002 includes a "Wilkinson-like," first-stage splitter/combiner circuit 1031 (e.g., circuit 531, FIG. 6), and two "Gysel-like," second-stage splitter/combiner circuits 1050, 1070 (e.g., circuits 650, 670, FIG. 6).

The system-side RF I/O port 1011 is electrically coupled (e.g., through balun 1010) to the system-side RF I/O terminal 1001 (e.g., terminal 111, 312 FIGS. 1, 3). The first-stage splitter/combiner circuit 1031 includes two differential quarter wave lines 1035, 1036 (e.g., lines 535-1/535-2, 536-1/536-2, FIG. 6) that extend in parallel from the system-side RF I/O port 1011 to two different interior RF I/O ports 1033, 1034 (e.g., ports 533-1/533-2, 534-1/534-2, FIG. 6). Noting that only one is shown in FIG. 10, isolation resistors 1037 (e.g., resistors 537-1, 537-2, FIG. 6) are coupled across the interior RF I/O ports 1033, 1034.

Each of the second-stage splitter/combiner circuits 1050, 1070 includes two differential quarter wave lines 1051, 1052, 1071, 1072 (e.g., lines 551-1/551-2, 552-1/552-2, 571-1/571-2, 572-1/572-2, FIG. 6) that extend in opposite directions from the interior RF I/O ports 1033, 1034 to the first, second, third, and fourth channel-side RF I/O ports 1020, 1021, 1022, 1023 (e.g., ports 620-623, FIG. 6). In addition, each of the second-stage splitter/combiner circuits 1050, 1070 includes two additional differential quarter wave lines 1053, 1054, 1073, 1074 (e.g., lines 553-1/553-2, 554-1/554-2, 573-1/573-2, 574-1/574-2, FIG. 6) that extend from the channel-side RF I/O ports 1020-1023 back toward the center of the circuits 1050, 1070 in parallel, as shown, with quarter wave lines 1051, 1052, 1071, 1072, respectively. Further still, each of the second-stage splitter/combiner circuits 1050, 1070 includes an isolation resistor 1059, 1079 (e.g., resistors 659, 679, FIG. 6) that is cross-coupled between the differential quarter wave lines 1053, 1054 or 1073, 1074, as discussed in more detail in conjunction with FIG. 6.

The first, second, third, and fourth channel-side RF I/O ports 1020, 1021, 1022, 1023 (e.g., ports 620-623, FIG. 6) each are coupled (e.g., through a short transmission line 1090, 1091, 1092, 1093 and a balun, not illustrated) to a first I/O port (e.g., I/O port 158, FIG. 1) of a different one of the transceiver channels 1080-1083. The second I/O ports (e.g., I/O port 159, FIG. 1) of each transceiver channel 1080-1083 is coupled to a different one of the channel-side RF I/O terminals 1025-1028 (e.g., terminals 120-123, 324-327, FIGS. 1, 3). As discussed in conjunction with FIGS. 1 and 3, each of the channel-side RF I/O terminals 1025-1028 may be coupled to a different antenna element (e.g., antenna elements 170-173, 370-373, FIGS. 1, 3), and more particularly to a side (or connection point) of each of those antenna elements that is associated with a first polarization (e.g., an H or V polarization). It may be noted at this point that the system-side RF I/O terminal 1001 and the first and third channel-side RF I/O terminals 1025, 1027 are located on a first side 1003 of the beamformer IC 1000 (with RF I/O terminal 1001 located between RF I/O terminals 1025, 1027), and the second and fourth channel-side RF I/O terminals 1026, 1028 are located on a second side 1004 of the beamformer IC 1000 that is opposite the first side 1003.

Referring now to the second 4-channel phased-array beamformer within beamformer IC 1000, the second beamformer includes a second system-side RF I/O terminal 1101 (e.g., terminal 112, 311 FIGS. 1, 3), a second hybrid splitter/combiner circuit 1102, four transceiver channels 1180, 1181, 1182, 1183 (e.g., transceiver channels 154-157, FIG. 1), and four channel-side RF I/O terminals 1125-1128 (e.g., terminals 124-127, 320-323, FIGS. 1, 3). The second hybrid splitter/combiner circuit 1102 is depicted to be a double-ended (differential) splitter/combiner circuit, which essentially has the same or similar structure as hybrid splitter/combiner circuit 900 (FIG. 9). In other embodiments, the second hybrid splitter/combiner circuit 1102 may be a differential circuit that has the same or similar structure as hybrid splitter/combiner circuit 800 (FIG. 8). For simplicity of illustration, each of the differential lines in the second hybrid splitter/combiner circuit 1102 is illustrated as single conductor. In such an embodiment, the first 4-channel phased-array beamformer also may include a system-side balun 1110 coupled between the system-side RF I/O terminal 1101 and the second hybrid splitter/combiner circuit 1102, along with four channel-side baluns (not illustrated) coupled between the four channel-side RF I/O ports 1120-1123 of the second hybrid splitter/combiner circuit 1102 and the four transceivers 1180-1183. The system-side balun 1110 is configured to convert between unbalanced signals at the second system-side RF I/O terminal 1101 and balanced (differential) signals processed by the second hybrid splitter/combiner circuit 1102. Similarly, each of the channel-side baluns is configured to convert between unbalanced signals processed by the transceiver channels 1180-1183 and balanced signals processed by the second hybrid splitter/combiner circuit 1102. In other embodiments, the second hybrid splitter/combiner circuit 1102 may be implemented as a single-ended hybrid splitter/combiner circuit (e.g., having a same or similar structure as hybrid splitter/beamformer circuit 700, FIG. 7), and the system-side and channel-side baluns may be excluded.

As mentioned above, the second hybrid splitter/combiner circuit 1102 essentially has a similar structure as hybrid splitter/combiner circuit 900 (FIG. 9). For brevity, the intricate details of hybrid splitter/combiner circuit 900 will not be repeated here, but those details are intended to be incorporated into the below description of hybrid splitter/combiner circuit 1102. The second hybrid splitter/combiner circuit 1102 has a system-side RF I/O port 1111 (e.g., port 811, FIG. 9) and four channel-side RF I/O ports 1120-1123 (e.g., ports 820-823, FIG. 9). In addition, the second hybrid splitter/combiner circuit 1102 includes a "Gysel-like," first-stage splitter/combiner circuit 1131 (e.g., circuit 931, FIG. 9), and two "Wilkinson-like," second-stage splitter/combiner circuits 1150, 1170 (e.g., circuits 850, 870, FIG. 9).

The system-side RF I/O port 1111 is electrically coupled (e.g., through balun 1110) to the system-side RF I/O terminal 1101 (e.g., terminal 112, 311 FIGS. 1, 3). The first-stage splitter/combiner circuit 1131 includes two differential quarter wave lines 1135, 1136 (e.g., lines 835-1/835-2, 836-1/836-2, FIG. 9) that extend in opposite directions from the system-side RF I/O port 1111 to first and second interior RF I/O ports 1133, 1134 (e.g., ports 833-1/833-2, 834-1/834-2, FIG. 9). In addition, the first-stage splitter/combiner circuit 1131 includes two additional differential quarter wave lines 1137, 1138 (e.g., lines 837-1/837-2, 838-1/838-2, FIG. 6) that extend from the interior RF I/O ports 1133, 1134 back toward the center of the circuit 1131 in parallel, as shown, with quarter wave lines 1135, 1136, respectively. Further still, the first-stage splitter/combiner circuit 1131 includes an isolation resistor 1159 (e.g., resistor 959, FIG. 9) that is cross-coupled between the differential quarter wave lines 1137, 1138, as discussed in more detail in conjunction with FIG. 9.

Each of the second-stage splitter/combiner circuits 1150, 1170 includes two differential quarter wave lines 1151, 1152 or 1171, 1172 (e.g., lines 851-1/851-2, 852-1/852-2 or 871-1/871-2, 872-1/872-2, FIG. 9) that extend in parallel from a different one of the two interior RF I/O ports 1133, 1134 (e.g., ports 833-1/833-2, 834-1/834-2, FIG. 9). Noting that only one is shown in FIG. 10 in each of circuits 1150, 1170, isolation resistors 1161, 1181 (e.g., resistors 861-1, 861-2 and 881-1, 881-2, FIG. 9) are coupled across the channel-side RF I/O ports 1120, 1121 or 1122, 1123.

The first, second, third, and fourth channel-side RF I/O ports 1120, 1121, 1122, 1123 (e.g., ports 820-823, FIG. 9) each are coupled (e.g., through a short transmission line 1190, 1191, 1192, 1193 and a balun, not illustrated) to a first I/O port (e.g., I/O port 158, FIG. 1) of a different one of the transceiver channels 1180-1183. The second I/O ports (e.g., I/O port 159, FIG. 1) of each transceiver channel 1180-1183 is coupled to a different one of the channel-side RF I/O terminals 1125-1128 (e.g., terminals 124-127, 320-323, FIGS. 1, 3). As discussed in conjunction with FIGS. 1 and 3, each of the channel-side RF I/O terminals 1125-1128 may be incorporated into a dual-polarization system in which the channel-side RF I/O terminals 1125-1128 are coupled to the same antenna elements to which the channel-side RF I/O terminals 1025-1028 are coupled (e.g., antenna elements 170-173, 370-373, FIGS. 1, 3), and more particularly to a side (or connection point) of each of those antenna elements that is associated with a second polarization (e.g., a V or H polarization) that is different from the first polarization. Alternatively, as discussed in conjunction with FIGS. 1 and 2, the beamformer IC 1000 may be incorporated in a single-polarization system (e.g., system 100, 200, FIGS. 1, 2), and each of the channel-side RF I/O terminals 1025-1028, 1125-1128 of the first and second beamformers may be coupled to a different antenna element (e.g., antenna elements 170-177 or 270-277, FIGS. 1, 2).

It may be noted at this point that the system-side RF I/O terminal 1101 is located on the second side 1004 of the beamformer IC 1000 (with RF I/O terminal 1101 located between RF I/O terminals 1026, 1028), channel-side RF I/O terminals 1125, 1126 are located on a third side 1005 of the beamformer IC 1000 that extends between the first and second sides 1003, 1004, and channel-side RF I/O terminals 1127, 1128 are located on a fourth side 1006 of the beamformer IC 1000 that is opposite the third side 1005.

In addition to the first and second hybrid splitter/combiner circuits 1002, 1102 and the multiple transceivers 1080-1083, 1180-1183, beamformer IC 1000 also may include a digital data interface (e.g., SPI 114, 214, FIGS. 1, 2) and one or more digital controller ICs 1040 (e.g., digital controller 115, 215, FIGS. 1, 2) coupled to the substrate, along with a plurality of control lines (not illustrated) coupled between the digital controller IC(s) 1040 and the transceivers 1080-1083, 1180-1183. As discussed previously, the digital data interface is configured to provide the control data to the digital controller IC(s) 1040. Based on control data indicating whether the beamformer IC 1000 should be in a transmit mode of operation or a receive mode of operation, the digital controller IC(s) 1040 may produce switch control signals that control the states of switches (e.g., switches 160, 165, FIG. 1) in the transceiver channels 1080-1083, 1180-1183.

The switch control signals may cause the switches either to complete transmit paths between I/O ports (e.g., ports 158, 159, FIG. 1) of the transceivers 1080-1083, 1180-1183, or to complete receive paths between the I/O ports of the transceivers 1080-1083, 1180-1183.

The preceding detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A multiple-stage splitter/combiner circuit comprising:
a first splitter/combiner circuit with a first input/output (I/O) port, a second I/O port, a third I/O port, a first quarter wave line with a first end coupled to the first I/O port and a second end coupled to the second I/O port, a second quarter wave line with a first end coupled to the first I/O port and a second end coupled to the third I/O port, and a first resistor with a first terminal coupled to the second I/O port and a second terminal coupled to the third I/O port; and
a second splitter/combiner circuit coupled to the first splitter/combiner circuit, wherein the second splitter/combiner circuit includes a fourth I/O port connected to the second I/O port, a fifth I/O port, a sixth I/O port, and a ring of multiple quarter wave lines that includes a third quarter wave line with a first end coupled to the fourth I/O port and a second end coupled to the fifth I/O port, a fourth quarter wave line with a first end coupled to the fourth I/O port and a second end coupled to the sixth I/O port, a fifth quarter wave line with a first end coupled to the fifth I/O port, and a sixth quarter wave line with a first end coupled to the sixth I/O port and a second end coupled to a second end of the fifth quarter wave line, wherein the third quarter wave line and the fourth quarter wave line extend from the fourth I/O port in different directions from each other.

2. A multiple-stage splitter/combiner circuit comprising:
a first splitter/combiner circuit with a first input/output (I/O) port, a second I/O port, a third I/O port, a first quarter wave line with a first end coupled to the first I/O port and a second end coupled to the second I/O port, a second quarter wave line with a first end coupled to the first I/O port and a second end coupled to the third I/O port, and a first resistor with a first terminal coupled to the second I/O port and a second terminal coupled to the third I/O port; and
a second splitter/combiner circuit coupled to the first splitter/combiner circuit, wherein the second splitter/combiner circuit includes a fourth I/O port, a fifth I/O port, a sixth I/O port, and a ring of multiple quarter wave lines that includes a third quarter wave line with a first end coupled to the fourth I/O port and a second end coupled to the fifth I/O port, a fourth quarter wave line with a first end coupled to the fourth I/O port and a second end coupled to the sixth I/O port, a fifth quarter wave line with a first end coupled to the fifth I/O port, and a sixth quarter wave line with a first end coupled to the sixth I/O port and a second end coupled to a second end of the fifth quarter wave line, wherein the third quarter wave line and the fourth quarter wave line extend from the fourth I/O port in different directions from each other, and wherein the first and second quarter wave lines extend in parallel with each other so that the second I/O port and the third I/O port are physically separated by a distance of about a width of the first resistor.

3. The multiple-stage splitter/combiner circuit of claim 1, wherein the third quarter wave line and the fourth quarter wave line extend from the fourth I/O port in opposite directions from each other so that the fifth I/O port and the sixth I/O port are physically separated by a distance equal to a combined length of the third and fourth quarter wave lines.

4. The multiple-stage splitter/combiner circuit of claim 1, wherein:
the first splitter/combiner circuit is a first-stage splitter/combiner circuit;
the second splitter/combiner circuit is a second-stage splitter/combiner circuit; and
the second I/O port is coupled to the fourth I/O port.

5. The multiple-stage splitter/combiner circuit of claim 4, further comprising:

a third splitter/combiner circuit coupled to the first splitter/combiner circuit, wherein the third splitter/combiner circuit includes a seventh I/O port, an eighth I/O port, a ninth I/O port, and a second ring of multiple quarter wave lines that includes a seventh quarter wave line with a first end coupled to the seventh I/O port and a second end coupled to the eighth I/O port, an eighth quarter wave line with a first end coupled to the seventh I/O port and a second end coupled to the ninth I/O port, a ninth quarter wave line with a first end coupled to the eighth I/O port, and a tenth quarter wave line with a first end coupled to the ninth I/O port and a second end coupled to a second end of the ninth quarter wave line, wherein the seventh quarter wave line and the eighth quarter wave line extend from the seventh I/O port in different directions from each other.

6. The multiple-stage splitter/combiner circuit of claim 1, wherein:
the second splitter/combiner circuit is a first-stage splitter/combiner circuit;
the first splitter/combiner circuit is a second-stage splitter/combiner circuit; and
the first I/O port is coupled to the fifth I/O port.

7. The multiple-stage splitter/combiner circuit of claim 6, further comprising:
a third splitter/combiner circuit coupled to the second splitter/combiner circuit, wherein the third splitter/combiner circuit includes a seventh I/O port, an eighth I/O port, a ninth I/O port, a seventh quarter wave line with a first end coupled to the seventh I/O port and a second end coupled to the eighth I/O port, an eighth quarter wave line with a first end coupled to the seventh I/O port and a second end coupled to the ninth I/O port, and a second resistor with a first terminal coupled to the seventh I/O port and a second terminal coupled to the eighth I/O port.

8. A multiple-stage splitter/combiner circuit comprising:
a first splitter/combiner circuit with a first input/output (I/O) port, a second I/O port, a third I/O port, a first quarter wave line with a first end coupled to the first I/O port and a second end coupled to the second I/O port, a second quarter wave line with a first end coupled to the first I/O port and a second end coupled to the third I/O port, and a first resistor with a first terminal coupled to the second I/O port and a second terminal coupled to the third I/O port; and
a second splitter/combiner circuit coupled to the first splitter/combiner circuit, wherein the second splitter/combiner circuit includes a fourth I/O port, a fifth I/O port, a sixth I/O port, and a ring of multiple quarter wave lines that includes a third quarter wave line with a first end coupled to the fourth I/O port and a second end coupled to the fifth I/O port, a fourth quarter wave line with a first end coupled to the fourth I/O port and a second end coupled to the sixth I/O port, a fifth quarter wave line with a first end coupled to the fifth I/O port, and a sixth quarter wave line with a first end coupled to the sixth I/O port and a second end coupled to a second end of the fifth quarter wave line, wherein the third quarter wave line and the fourth quarter wave line extend from the fourth I/O port in different directions from each other, and wherein the first, second, third, fourth, fifth, and sixth quarter wave lines each include an unbalanced transmission line.

9. The multiple-stage splitter/combiner circuit of claim 8, wherein the second splitter/combiner circuit further comprises:

a first port coupled to the second end of the fifth quarter wave line;
a second port coupled to the second end of the sixth quarter wave line;
a seventh quarter wave line coupled between the first port and a conductive node;
an eighth quarter wave line coupled between the second port and the conductive node;
a second resistor coupled between the first port and a ground reference; and
a third resistor coupled between the second port and the ground reference.

10. A multiple-stage splitter/combiner circuit comprising:
a first splitter/combiner circuit with a first input/output (I/O) port, a second I/O port, a third I/O port, a first quarter wave line with a first end coupled to the first I/O port and a second end coupled to the second I/O port, a second quarter wave line with a first end coupled to the first I/O port and a second end coupled to the third I/O port, and a first resistor with a first terminal coupled to the second I/O port and a second terminal coupled to the third I/O port; and
a second splitter/combiner circuit coupled to the first splitter/combiner circuit, wherein the second splitter/combiner circuit includes a fourth I/O port, a fifth I/O port, a sixth I/O port, and a ring of multiple quarter wave lines that includes a third quarter wave line with a first end coupled to the fourth I/O port and a second end coupled to the fifth I/O port, a fourth quarter wave line with a first end coupled to the fourth I/O port and a second end coupled to the sixth I/O port, a fifth quarter wave line with a first end coupled to the fifth I/O port, and a sixth quarter wave line with a first end coupled to the sixth I/O port and a second end coupled to a second end of the fifth quarter wave line, wherein the third quarter wave line and the fourth quarter wave line extend from the fourth I/O port in different directions from each other, and wherein the first, second, third, fourth, fifth, and sixth quarter wave lines each include a balanced transmission line.

11. The multiple-stage splitter/combiner circuit of claim 10, wherein the second splitter/combiner circuit further comprises:
a first differential conductive node coupled to the second end of the fifth quarter wave line;
a second differential conductive node coupled to the second end of the sixth quarter wave line;
a seventh quarter wave line coupled between the first differential conductive node and a third differential conductive node;
an eighth quarter wave line coupled between the second differential conductive node and the third differential conductive node;
a second resistor coupled across the first differential conductive node; and
a third resistor coupled across the second differential conductive node.

12. The multiple-stage splitter/combiner circuit of claim 10, wherein the second splitter/combiner circuit further comprises:
a differential conductive node cross-coupled to the second end of the fifth quarter wave line and to the second end of the sixth quarter wave line; and
a second resistor coupled across the differential conductive node.

13. A beamformer integrated circuit comprising:
a first system-side radio frequency (RF) input/output (I/O) terminal;
N first antenna-side RF I/O terminals;
N first transceiver channels electrically coupled to the N first antenna-side RF I/O terminals; and
a first multiple-stage splitter/combiner circuit electrically coupled between the first system- side RF I/O terminal and the N first transceiver channels, wherein the first multiple-stage splitter/combiner circuit includes a first splitter/combiner circuit with a first I/O port, a second I/O port, a third I/O port, a first quarter wave line with a first end coupled to the first I/O port and a second end coupled to the second I/O port, a second quarter wave line with a first end coupled to the first I/O port and a second end coupled to the third I/O port, and a first resistor with a first terminal coupled to the second I/O port and a second terminal coupled to the third I/O port, and
a second splitter/combiner circuit coupled to the first splitter/combiner circuit, wherein the second splitter/combiner circuit includes a fourth I/O port, a fifth I/O port, a sixth I/O port, and a ring of multiple quarter wave lines that includes a third quarter wave line with a first end coupled to the fourth I/O port and a second end coupled to the fifth I/O port, a fourth quarter wave line with a first end coupled to the fourth I/O port and a second end coupled to the sixth I/O port, a fifth quarter wave line with a first end coupled to the fifth I/O port, and a sixth quarter wave line with a first end coupled to the sixth I/O port and a second end coupled to a second end of the fifth quarter wave line, wherein the third quarter wave line and the fourth quarter wave line extend from the fourth I/O port in different directions from each other.

14. The beamformer integrated circuit of claim 13, further comprising:
N first antenna elements, wherein each of the N first antenna elements includes a first connection point associated with a first polarization, and the N first antenna-side RF I/O terminals each are coupled to the first connection point of a different one of the N first antenna elements.

15. The beamformer integrated circuit of claim 13, wherein:
the first splitter/combiner circuit is a first-stage splitter/combiner circuit;
the second splitter/combiner circuit is a second-stage splitter/combiner circuit;
the second I/O port is coupled to the fourth I/O port; and
the multiple-stage splitter/combiner circuit further includes
a third splitter/combiner circuit coupled to the first splitter/combiner circuit, wherein the third splitter/combiner circuit includes a seventh I/O port, an eighth I/O port, a ninth I/O port, and a second ring of multiple quarter wave lines that includes a seventh quarter wave line with a first end coupled to the seventh I/O port and a second end coupled to the eighth I/O port, an eighth quarter wave line with a first end coupled to the seventh I/O port and a second end coupled to the ninth I/O port, a ninth quarter wave line with a first end coupled to the eighth I/O port, and a tenth quarter wave line with a first end coupled to the ninth I/O port and a second end coupled to a second end of the ninth quarter wave line, wherein the seventh quarter wave line and the eighth quarter wave line extend from the seventh I/O port in different directions from each other.

16. The beamformer integrated circuit of claim 13, wherein:
the second splitter/combiner circuit is a first-stage splitter/combiner circuit;
the first splitter/combiner circuit is a second-stage splitter/combiner circuit;
the first I/O port is coupled to the fifth I/O port; and
the multiple-stage splitter/combiner circuit further includes
a third splitter/combiner circuit coupled to the second splitter/combiner circuit, wherein the third splitter/combiner circuit includes a seventh I/O port, an eighth I/O port, a ninth I/O port, a seventh quarter wave line with a first end coupled to the seventh I/O port and a second end coupled to the eighth I/O port, an eighth quarter wave line with a first end coupled to the seventh I/O port and a second end coupled to the ninth I/O port, and a second resistor with a first terminal coupled to the seventh I/O port and a second terminal coupled to the eighth I/O port.

17. The beamformer integrated circuit of claim 13, wherein:
the first, second, third, fourth, fifth, and sixth quarter wave lines are differential quarter wave lines; and
the second splitter/combiner circuit further includes
a differential conductive node cross-coupled to the second end of the fifth quarter wave line and to the second end of the sixth quarter wave line, and
a second resistor coupled across the differential conductive node.

18. A communication system comprising:
a beamformer that includes
a first system-side radio frequency (RF) input/output (I/O) terminal,
N first antenna-side RF I/O terminals,
N first transceiver channels electrically coupled to the N first antenna-side RF I/O terminals, and
a first multiple-stage splitter/combiner circuit electrically coupled between the first system-side RF I/O terminal and the N first transceiver channels, wherein the first multiple-stage splitter/combiner circuit includes
a first splitter/combiner circuit with a first I/O port, a second I/O port, a third I/O port, a first quarter wave line with a first end coupled to the first I/O port and a second end coupled to the second I/O port, a second quarter wave line with a first end coupled to the first I/O port and a second end coupled to the third I/O port, and a first resistor with a first terminal coupled to the second I/O port and a second terminal coupled to the third I/O port, and
a second splitter/combiner circuit coupled to the first splitter/combiner circuit, wherein the second splitter/combiner circuit includes a fourth I/O port, a fifth I/O port, a sixth I/O port, and a first ring of multiple quarter wave lines that includes a third quarter wave line with a first end coupled to the fourth I/O port and a second end coupled to the fifth I/O port, a fourth quarter wave line with a first end coupled to the fourth I/O port and a second end coupled to the sixth I/O port, a fifth quarter wave line with a first end coupled to the fifth I/O port, and a sixth quarter wave line with a first end coupled to the sixth I/O port and a second end coupled to a second end of the fifth quarter wave line, wherein the third quarter wave line and the fourth quarter wave line extend from the fourth I/O port in different directions from each other; and N first antenna elements, wherein each of the N first antenna elements includes a first connection point associated with a first polarization, and the N first antenna-side RF I/O terminals each are coupled to the first connection point of a different one of the N first antenna elements.

19. The communication system of claim 18, wherein:

each of the N first antenna elements also includes a second connection point associated with a second polarization that is different from the first polarization; and the beamformer further comprises
- a second system-side RF I/O terminal,
- N second antenna-side RF I/O terminals,
- N second transceiver channels electrically coupled to the N second antenna-side RF I/O terminals, and
- a second multiple-stage splitter/combiner circuit electrically coupled between the second system-side RF I/O terminal and the N second transceiver channels, wherein the second multiple-stage splitter/combiner circuit includes
  - a third splitter/combiner circuit with a seventh I/O port, an eighth I/O port, a ninth I/O port, a seventh quarter wave line with a first end coupled to the seventh I/O port and a second end coupled to the eighth I/O port, an eighth quarter wave line with a first end coupled to the seventh I/O port and a second end coupled to the ninth I/O port, and a second resistor with a first terminal coupled to the eighth I/O port and a second terminal coupled to the ninth I/O port, and
  - a fourth splitter/combiner circuit coupled to the first splitter/combiner circuit, wherein the second splitter/combiner circuit includes a tenth I/O port, an eleventh I/O port, a twelfth I/O port, and a second ring of multiple quarter wave lines that includes a ninth quarter wave line with a first end coupled to the tenth I/O port and a second end coupled to the eleventh I/O port, a tenth quarter wave line with a first end coupled to the tenth I/O port and a second end coupled to the twelfth I/O port, an eleventh quarter wave line with a first end coupled to the tenth I/O port, and a twelfth quarter wave line with a first end coupled to the eleventh I/O port and a second end coupled to a second end of the eleventh quarter wave line, wherein the ninth quarter wave line and the tenth quarter wave line extend from the tenth I/O port in different directions from each other; and the N second antenna-side RF I/O terminals each are coupled to the second connection point of a different one of the N first antenna elements.

20. The communication system of claim 18, wherein N equals 4.

* * * * *